(12) United States Patent
Lawrence

(10) Patent No.: US 10,409,885 B2
(45) Date of Patent: Sep. 10, 2019

(54) COMPUTER ARCHITECTURE FOR EMULATING A DISTANCE MEASURING DEVICE FOR A CORRELITHM OBJECT PROCESSING SYSTEM

(71) Applicant: BANK OF AMERICA CORPORATION, Charlotte, NC (US)

(72) Inventor: Patrick N. Lawrence, Plano, TX (US)

(73) Assignee: Bank of America Corporation, Charlotte, NC (US)

( * ) Notice: Subject to any disclaimer, the term of this patent is extended or adjusted under 35 U.S.C. 154(b) by 54 days.

(21) Appl. No.: 15/701,183

(22) Filed: Sep. 11, 2017

(65) Prior Publication Data

US 2019/0079900 A1     Mar. 14, 2019

(51) Int. Cl.
| G06F 17/15 | (2006.01) |
|---|---|
| G06F 17/27 | (2006.01) |
| G06F 17/17 | (2006.01) |
| G06F 16/00 | (2019.01) |
| G06K 9/74 | (2006.01) |

(52) U.S. Cl.
CPC ............ *G06F 17/153* (2013.01); *G06F 17/17* (2013.01); *G06F 17/278* (2013.01); *G06K 9/74* (2013.01); *G06F 16/00* (2019.01)

(58) Field of Classification Search
CPC .................................................... G06F 17/153
See application file for complete search history.

(56) References Cited

U.S. PATENT DOCUMENTS

| 5,946,673 A | 8/1999 | Francone et al. |
|---|---|---|
| 6,167,391 A | 12/2000 | Lawrence |
| 6,480,626 B1 * | 11/2002 | Venable .................. G06T 9/001 |
| | | 382/173 |
| 6,941,287 B1 | 9/2005 | Vaidyanathan et al. |
| 6,943,686 B2 | 9/2005 | Allen |
| 6,947,913 B1 | 9/2005 | Lawrence |
| 7,015,835 B2 | 3/2006 | Lawrence et al. |

(Continued)

OTHER PUBLICATIONS

Meersman, R. et al., "On the Move to Meaningful Internet Systems 2005: CoopIS, DOA and ODBASE," OTM Confederated International Conferences CoopIS, DOA and ODBASE Oct. 2005 Agia Napa, Cyprus, Proceedings, Part I, Oct. 31-Nov. 4, 2005, pp. 763-779.

(Continued)

*Primary Examiner* — Andrew Caldwell
*Assistant Examiner* — Emily E Larocque
(74) *Attorney, Agent, or Firm* — Michael A. Springs

(57) ABSTRACT

A device configured to emulate a distance measuring device in a correlithm object processing system. The device is configured to receive an input binary string and to mask a first portion of the input binary string. The device is configured to identify a first binary string in a counting table matching a second portion of the input binary string, to fetch a first numeric value linked with the first binary string, and to increment a count value of a counter by the first numeric value. The device is configured to mask the second portion and to unmask the first portion. The device is configured to identify a second binary string in the counting table matching the first portion, to fetch a second numeric value linked with the second binary string, to increment the count value of the counter by the second numeric value, and to output the count value.

15 Claims, 13 Drawing Sheets

(56) References Cited

U.S. PATENT DOCUMENTS

| | | |
|---|---|---|
| 7,031,969 B2 | 4/2006 | Lawrence et al. |
| 7,246,129 B2 | 7/2007 | Lawrence et al. |
| 7,310,622 B2 | 12/2007 | Lawrence et al. |
| 7,349,928 B2 | 3/2008 | Lawrence et al. |

OTHER PUBLICATIONS

Lawrence, P. N., "Correlithm Object Technology," Apr. 2004, 229 pages.

Lawrence, P. N., "Computer Architecture for Emulating an Output Adapter for a Correlithm Object Processing System," U.S. Appl. No. 15/701,118, filed Sep. 11, 2017, 56 pages.

Lawrence, P. N., "Computer Architecture for Emulating an Image Output Adapter for a Correlithm Object Processing System," U.S. Appl. No. 15/701,161, filed Sep. 21, 2017, 57 pages.

Lawrence, P. N., Computer Architecture for Emulating an Image Input Adapter for a Correlithm Object Processing System, U.S. Appl. No. 15/701,220, filed Sep. 11, 2017, 56 pages.

Lawrence, P. N., "Computer Architecture for Emulating a Correlithm Object Processing System," U.S. Appl. No. 15/701,258, filed Sep. 11, 2017, 59 pages.

Lawrence, P. N., "Computer Architecture for Emulating N-Dimensional Workspaces in a Correlithm Object Processing System," U.S. Appl. No. 15/701,294, filed Sep. 11, 2017, 56 pages.

Lawrence, P. N., "Computer Architecture for Emulating a Hamming Distance Measuring Device for a Correlithm Object Processing System," U.S. Appl. No. 15/701,314, filed Sep. 11, 2017, 59 pages.

\* cited by examiner ns such as counting, sorting, indexing, and mathematical calculations. Even when performing operations that involve other number systems (e.g. floating point), conventional computers still resort to using ordinal binary integers to perform any operations.

COMPUTER ARCHITECTURE FOR EMULATING A DISTANCE MEASURING DEVICE FOR A CORRELITHM OBJECT PROCESSING SYSTEM

TECHNICAL FIELD

The present disclosure relates generally to computer architectures for emulating a processing system, and more specifically to computer architectures for emulating a correlithm object processing system.

BACKGROUND

Conventional computers are highly attuned to using operations that require manipulating ordinal numbers, especially ordinal binary integers. The value of an ordinal number corresponds with its position in a set of sequentially ordered number values. These computers use ordinal binary integers to represent, manipulate, and store information. These computers rely on the numerical order of ordinal binary integers representing data to perform various operations such as counting, sorting, indexing, and mathematical calculations. Even when performing operations that involve other number systems (e.g. floating point), conventional computers still resort to using ordinal binary integers to perform any operations.

Ordinal based number systems only provide information about the sequence order of the numbers themselves based on their numeric values. Ordinal numbers do not provide any information about any other types of relationships for the data being represented by the numeric values such as similarity. For example, when a conventional computer uses ordinal numbers to represent data samples (e.g. images or audio signals), different data samples are represented by different numeric values. The different numeric values do not provide any information about how similar or dissimilar one data sample is from another. Unless there is an exact match in ordinal number values, conventional systems are unable to tell if a data sample matches or is similar to any other data samples. As a result, conventional computers are unable to use ordinal numbers by themselves for comparing different data samples and instead these computers rely on complex signal processing techniques. Determining whether a data sample matches or is similar to other data samples is not a trivial task and poses several technical challenges for conventional computers. These technical challenges result in complex processes that consume processing power which reduces the speed and performance of the system. The ability to compare unknown data samples to known data samples is crucial for many security applications such as face recognition, voice recognition, and fraud detection.

Thus, it is desirable to provide a solution that allows computing systems to efficiently determine how similar different data samples are to each other and to perform operations based on their similarity.

SUMMARY

Conventional computers are highly attuned to using operations that require manipulating ordinal numbers, especially ordinal binary integers. The value of an ordinal number corresponds with its position in an set of sequentially ordered number values. These computers use ordinal binary integers to represent, manipulate, and store information. These computers rely on the numerical order of ordinal binary integers representing data to perform various operations such as counting, sorting, indexing, and mathematical calculations. Even when performing operations that involve other number systems (e.g. floating point), conventional computers still resort to using ordinal binary integers to perform any operations.

Ordinal based number systems only provide information about the sequence order of the numbers themselves based on their numeric values. Ordinal numbers do not provide any information about any other types of relationships for the data being represented by the numeric values such as similarity. For example, when a conventional computer uses ordinal numbers to represent data samples (e.g. images or audio signals), different data samples are represented by different numeric values. The different numeric values do not provide any information about how similar or dissimilar one data sample is from another. Unless there is an exact match in ordinal number values, conventional systems are unable to tell if a data sample matches or is similar to any other data samples. As a result, conventional computers are unable to use ordinal numbers by themselves for comparing different data samples and instead these computers rely on complex signal processing techniques. Determining whether a data sample matches or is similar to other data samples is not a trivial task and poses several technical challenges for conventional computers. These technical challenges result in complex processes that consume processing power which reduces the speed and performance of the system. The ability to compare unknown data samples to known data samples is crucial for many applications such as security application (e.g. face recognition, voice recognition, and fraud detection).

The system described in the present application provides a technical solution that enables the system to efficiently determine how similar different objects are to each other and to perform operations based on their similarity. In contrast to conventional systems, the system uses an unconventional configuration to perform various operations using categorical numbers and geometric objects, also referred to as correlithm objects, instead of ordinal numbers. Using categorical numbers and correlithm objects on a conventional device involves changing the traditional operation of the computer to support representing and manipulating concepts as correlithm objects. A device or system may be configured to implement or emulate a special purpose computing device capable of performing operations using correlithm objects. Implementing or emulating a correlithm object processing system improves the operation of a device by enabling the device to perform non-binary comparisons (i.e. match or no match) between different data samples. This enables the device to quantify a degree of similarity between different data samples. This increases the flexibility of the device to work with data samples having different data types and/or formats, and also increases the speed and performance of the device when performing operations using data samples. These technical advantages and other improvements to the device are described in more detail throughout the disclosure.

In one embodiment, the system is configured to use binary integers as categorical numbers rather than ordinal numbers which enables the system to determine how similar a data sample is to other data samples. Categorical numbers provide information about similar or dissimilar different data samples are from each other. For example, categorical numbers can be used in facial recognition applications to represent different images of faces and/or features of the faces. The system provides a technical advantage by allowing the system to assign correlithm objects represented by categorical numbers to different data samples based on how similar they are to other data samples. As an example, the system is able to assign correlithm objects to different images of people such that the correlithm objects can be directly used to determine how similar the people in the images are to each other. In other words, the system is able to use correlithm objects in facial recognition applications to quickly determine whether a captured image of a person matches any previously stored images without relying on conventional signal processing techniques.

Correlithm object processing systems use new types of data structures called correlithm objects that improve the way a device operates, for example, by enabling the device to perform non-binary data set comparisons and to quantify the similarity between different data samples. Correlithm objects are data structures designed to improve the way a device stores, retrieves, and compares data samples in memory. Correlithm objects also provide a data structure that is independent of the data type and format of the data samples they represent. Correlithm objects allow data samples to be directly compared regardless of their original data type and/or format.

A correlithm object processing system uses a combination of a sensor table, a node table, and/or an actor table to provide a specific set of rules that improve computer-related technologies by enabling devices to compare and to determine the degree of similarity between different data samples regardless of the data type and/or format of the data sample they represent. The ability to directly compare data samples having different data types and/or formatting is a new functionality that cannot be performed using conventional computing systems and data structures.

In addition, correlithm object processing system uses a combination of a sensor table, a node table, and/or an actor table to provide a particular manner for transforming data samples between ordinal number representations and correlithm objects in a correlithm object domain. Transforming data samples between ordinal number representations and correlithm objects involves fundamentally changing the data type of data samples between an ordinal number system and a categorical number system to achieve the previously described benefits of the correlithm object processing system.

Using correlithm objects allows the system or device to compare data samples (e.g. images) even when the input data sample does not exactly match any known or previously stored input values. For example, an input data sample that is an image may have different lighting conditions than the previously stored images. The differences in lighting conditions can make images of the same person appear different from each other. The device uses an unconventional configuration that implements a correlithm object processing system that uses the distance between the data samples which are represented as correlithm objects and other known data samples to determine whether the input data sample matches or is similar to the other known data samples. Implementing a correlithm object processing system fundamentally changes the device and the traditional data processing paradigm. Implementing the correlithm object processing system improves the operation of the device by enabling the device to perform non-binary comparisons of data samples. In other words, the device is able to determine how similar the data samples are to each other even when the data samples are not exact matches. In addition, the device is able to quantify how similar data samples are to one another. The ability to determine how similar data samples are to each others is unique and distinct from conventional computers that can only perform binary comparisons to identify exact matches.

The problems associated with comparing data sets and identifying matches based on the comparison are problems necessarily rooted in computer technologies. As described above, conventional systems are limited to a binary comparison that can only determine whether an exact match is found. Emulating a correlithm object processing system provides a technical solution that addresses problems associated with comparing data sets and identifying matches. Using correlithm objects to represent data samples fundamentally changes the operation of a device and how the device views data samples. By implementing a correlithm object processing system, the device can determine the distance between the data samples and other known data samples to determine whether the input data sample matches or is similar to the other known data samples. In addition, the device is able to determine a degree of similarity that quantifies how similar different data samples are to one another.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 8:
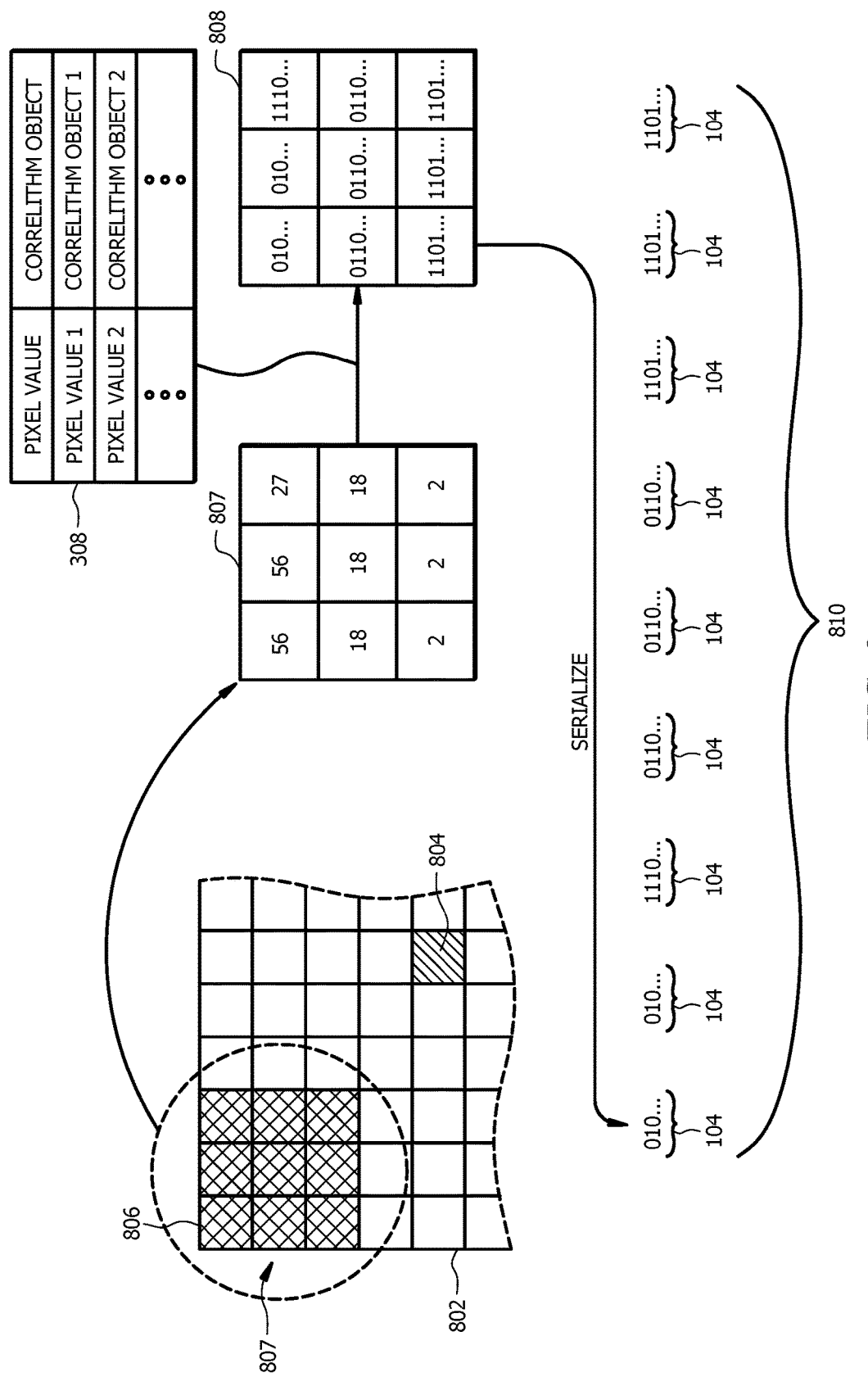
FIG. 8 is a schematic diagram of an embodiment of a process for emulating an image input adapter for a correlithm object processing system.
Figure 9:
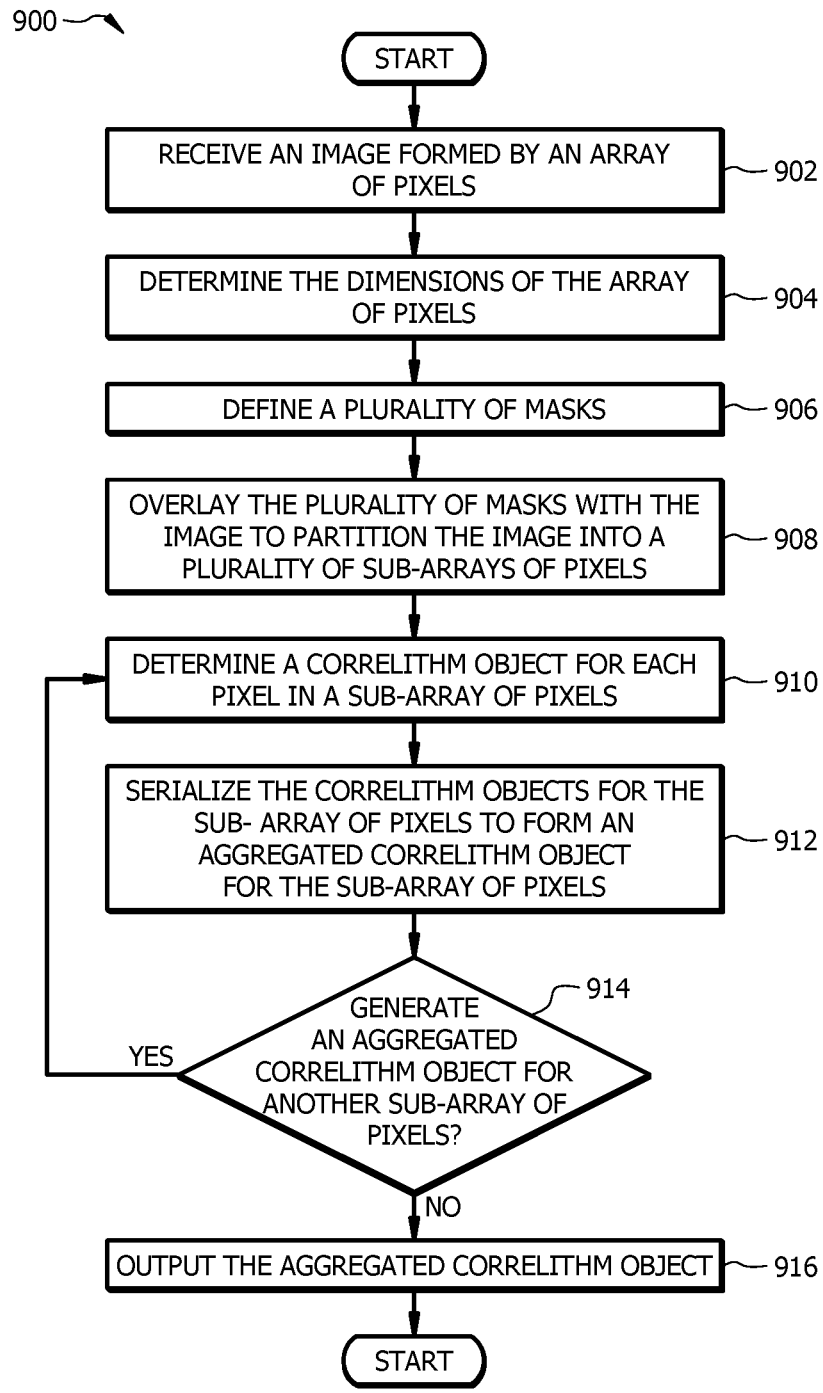
FIG. 9 is a flowchart of an embodiment of an image input adapting emulation method.
Figure 10:
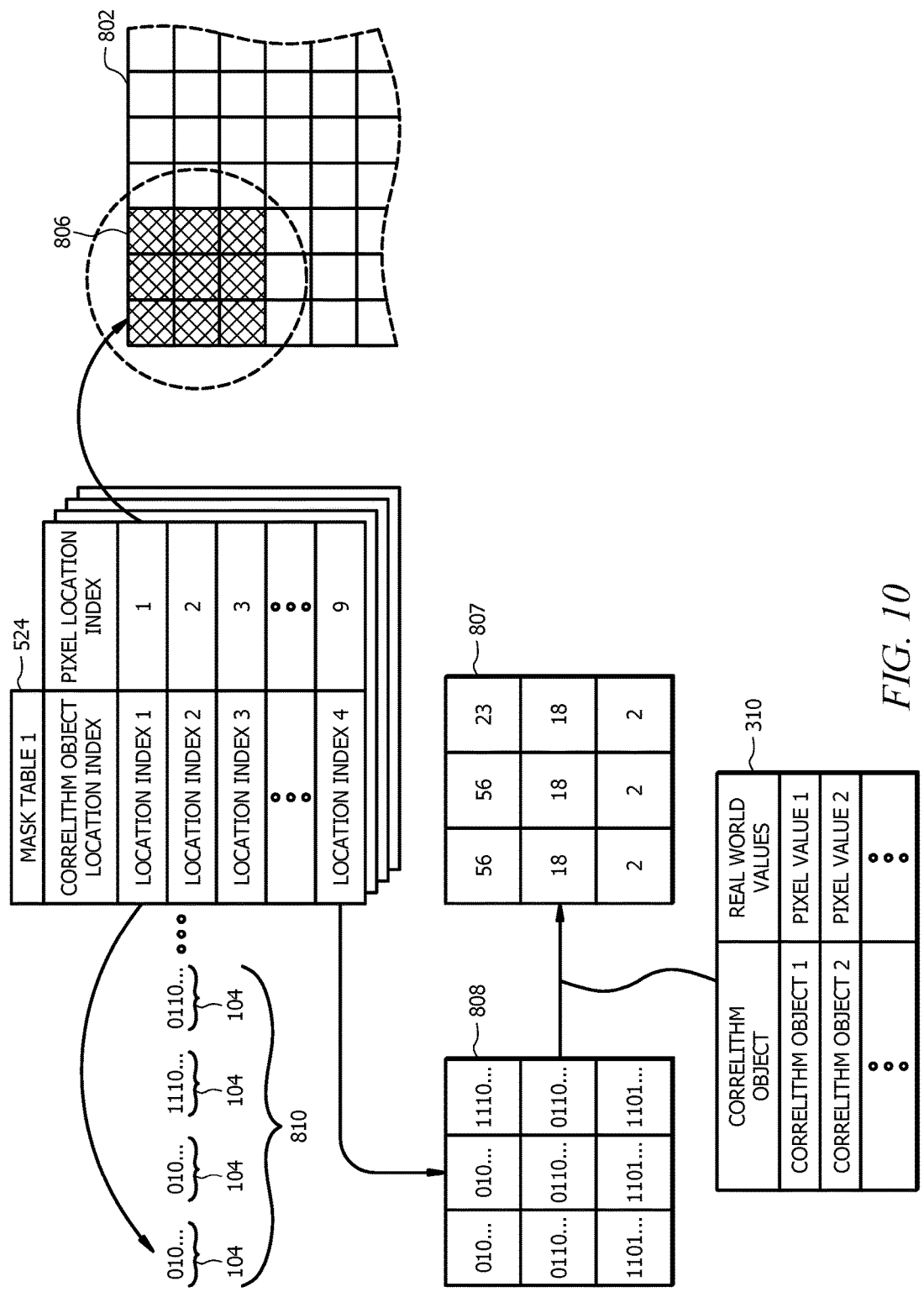
FIG. 10 is a schematic diagram of an embodiment of a process for emulating an image output adapter for a correlithm object processing system.
Figure 11:
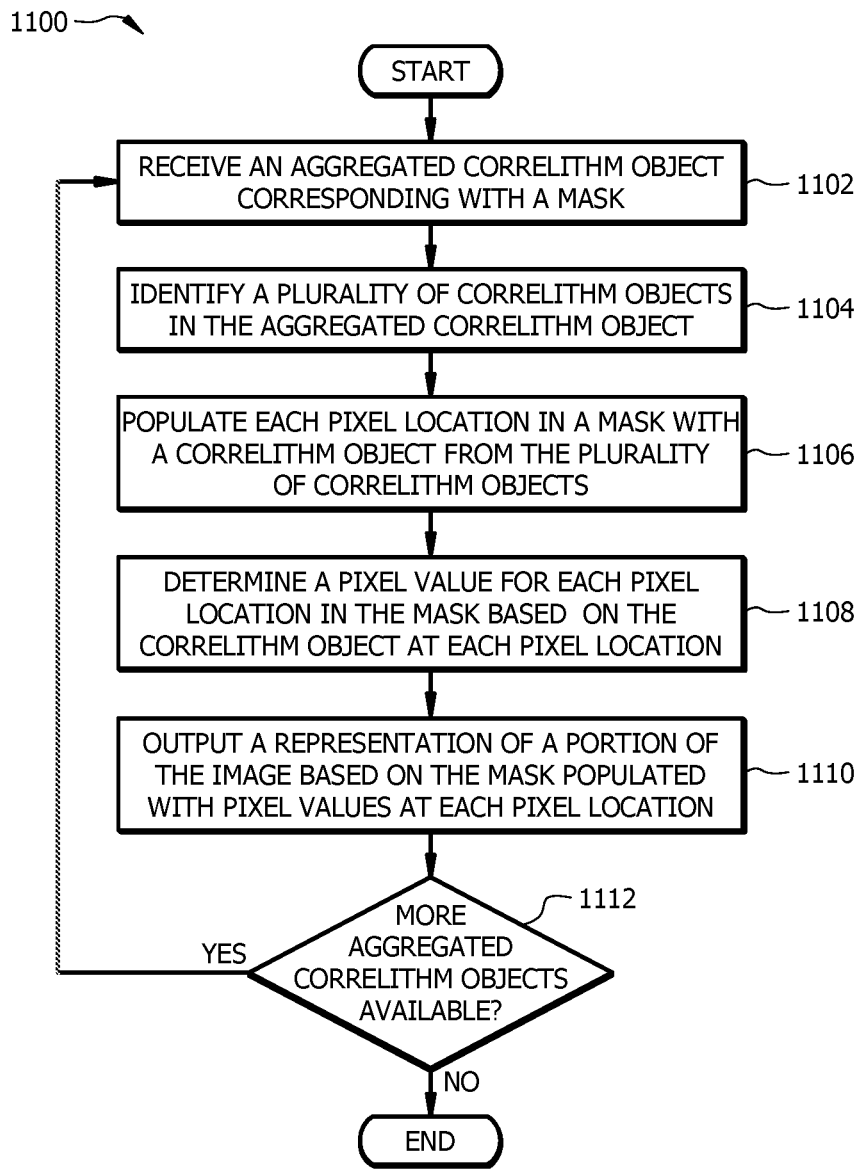
FIG. 11 is a flowchart of an embodiment of an image output adapter emulation method.

FIGS. 1-5 describe various embodiments of how a correlithm object processing system may be implemented or emulated in hardware, such as a special purpose computer. FIGS. 6A, 6B, 7A, and 7B describe processes for determining distances between correlithm objects in a correlithm object processing system. FIGS. 8 and 9 describe an embodiment of an image input adapter for a correlithm object processing system. FIGS. 10 and 11 describe an image output adapter for a correlithm object processing system.

Figure 1:
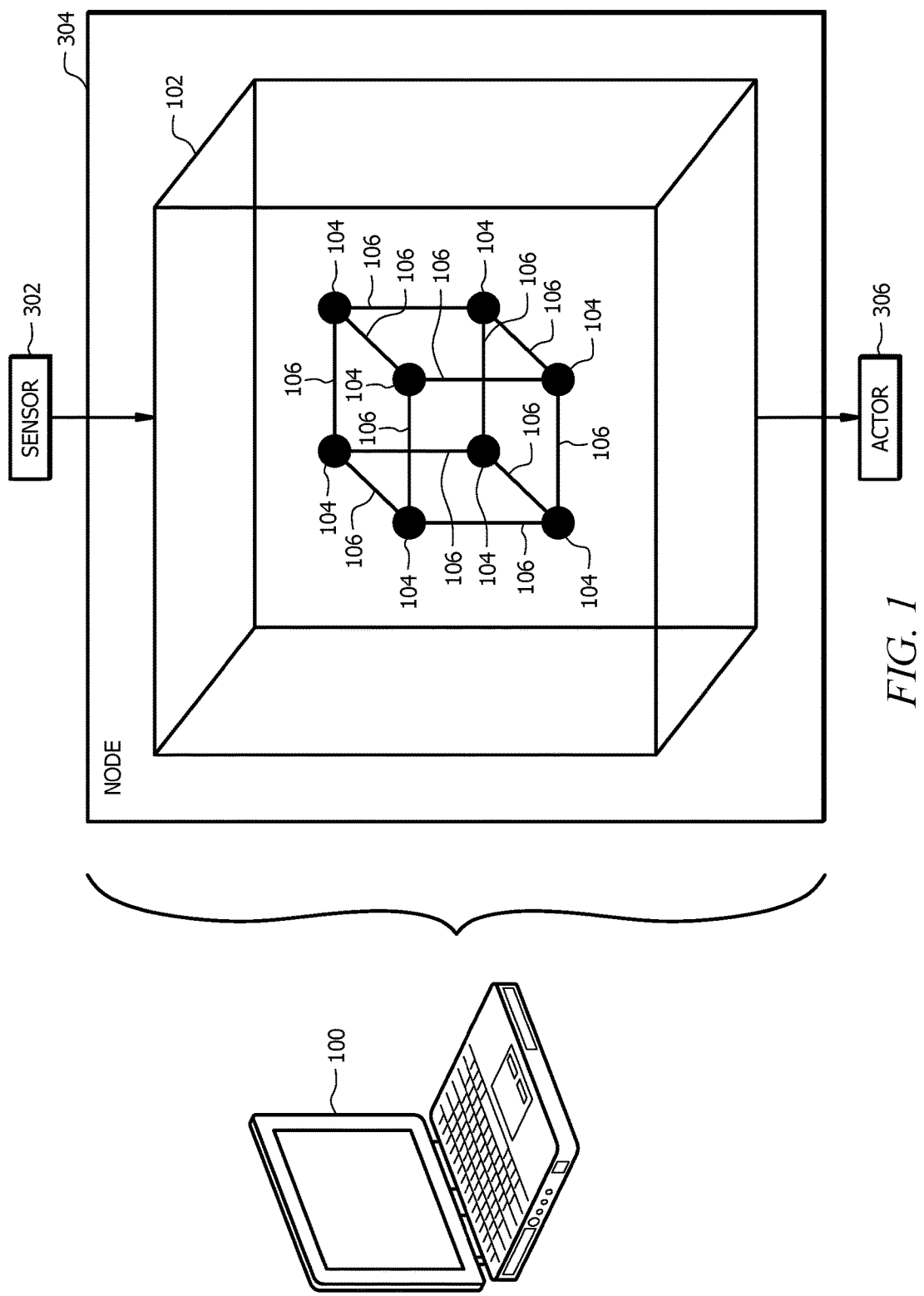
FIG. 1 is a schematic view of an embodiment of a special purpose computer implementing correlithm objects in an n-dimensional space.

FIG. 1 is a schematic view of an embodiment of a user device 100 implementing correlithm objects 104 in an n-dimensional space 102. Examples of user devices 100 include, but are not limited to, desktop computers, mobile phones, tablet computers, laptop computers, or other special purpose computer platform. The user device 100 is configured to implement or emulate a correlithm object processing system that uses categorical numbers to represent data samples as correlithm objects 104 in a high-dimensional space 102, for example a high-dimensional binary cube. Additional information about the correlithm object processing system is described in FIG. 3. Additional information about configuring the user device 100 to implement or emulate a correlithm object processing system is described in FIG. 5.

Conventional computers rely on the numerical order of ordinal binary integers representing data to perform various operations such as counting, sorting, indexing, and mathematical calculations. Even when performing operations that involve other number systems (e.g. floating point), conventional computers still resort to using ordinal binary integers to perform any operations. Ordinal based number systems only provide information about the sequence order of the numbers themselves based on their numeric values. Ordinal numbers do not provide any information about any other types of relationships for the data being represented by the numeric values, such as similarity. For example, when a conventional computer uses ordinal numbers to represent data samples (e.g. images or audio signals), different data samples are represented by different numeric values. The different numeric values do not provide any information about how similar or dissimilar one data sample is from another. In other words, conventional computers are only able to make binary comparisons of data samples which only results in determining whether the data samples match or do not match. Unless there is an exact match in ordinal number values, conventional systems are unable to tell if a data sample matches or is similar to any other data samples. As a result, conventional computers are unable to use ordinal numbers by themselves for determining similarity between different data samples, and instead these computers rely on complex signal processing techniques. Determining whether a data sample matches or is similar to other data samples is not a trivial task and poses several technical challenges for conventional computers. These technical challenges result in complex processes that consume processing power which reduces the speed and performance of the system.

In contrast to conventional systems, the user device 100 operates as a special purpose machine for implementing or emulating a correlithm object processing system. Implementing or emulating a correlithm object processing system improves the operation of the user device 100 by enabling the user device 100 to perform non-binary comparisons (i.e. match or no match) between different data samples. This enables the user device 100 to quantify a degree of similarity between different data samples. This increases the flexibility of the user device 100 to work with data samples having different data types and/or formats, and also increases the speed and performance of the user device 100 when performing operations using data samples. These improvements and other benefits to the user device 100 are described in more detail below and throughout the disclosure.

For example, the user device 100 employs the correlithm object processing system to allow the user device 100 to compare data samples even when the input data sample does not exactly match any known or previously stored input values. Implementing a correlithm object processing system fundamentally changes the user device 100 and the traditional data processing paradigm. Implementing the correlithm object processing system improves the operation of the user device 100 by enabling the user device 100 to perform non-binary comparisons of data samples. In other words, the user device 100 is able to determine how similar the data samples are to each other even when the data samples are not exact matches. In addition, the user device 100 is able to quantify how similar data samples are to one another. The ability to determine how similar data samples are to each others is unique and distinct from conventional computers that can only perform binary comparisons to identify exact matches.

The user device's 100 ability to perform non-binary comparisons of data samples also fundamentally changes traditional data searching paradigms. For example, conventional search engines rely on finding exact matches or exact partial matches of search tokens to identify related data samples. For instance, conventional text-based search engine are limited to finding related data samples that have text that exactly matches other data samples. These search engines only provide a binary result that identifies whether or not an exact match was found based on the search token. Implementing the correlithm object processing system improves the operation of the user device 100 by enabling the user device 100 to identify related data samples based on how similar the search token is to other data sample. These improvements result in increased flexibility and faster search time when using a correlithm object processing system. The ability to identify similarities between data samples expands the capabilities of a search engine to include data samples that may not have an exact match with a search token but are still related and similar in some aspects. The user device 100 is also able to quantify how similar data samples are to each other based on characteristics besides exact matches to the search token. Implementing the correlithm object processing system involves operating the user device 100 in an unconventional manner to achieve these technological improvements as well as other benefits described below for the user device 100.

Computing devices typically rely on the ability to compare data sets (e.g. data samples) to one another for processing. For example, in security or authentication applications a computing device is configured to compare an input of an unknown person to a data set of known people (or biometric information associated with these people). The problems associated with comparing data sets and identifying matches based on the comparison are problems necessarily rooted in computer technologies. As described above, conventional systems are limited to a binary comparison that can only determine whether an exact match is found. As an example, an input data sample that is an image of a person may have different lighting conditions than previously stored images. In this example, different lighting conditions can make images of the same person appear different from each other. Conventional computers are unable to distinguish between two images of the same person with different lighting conditions and two images of two different people without complicated signal processing. In both of these cases, conventional computers can only determine that the images are different. This is because conventional computers rely on manipulating ordinal numbers for processing.

In contrast, the user device 100 uses an unconventional configuration that uses correlithm objects to represent data samples. Using correlithm objects to represent data samples fundamentally changes the operation of the user device 100 and how the device views data samples. By implementing a correlithm object processing system, the user device 100 can determine the distance between the data samples and other known data samples to determine whether the input data sample matches or is similar to the other known data samples, as explained in detail below. Unlike the conventional computers described in the previous example, the user device 100 is able to distinguish between two images of the same person with different lighting conditions and two images of two different people by using correlithm objects 104. Correlithm objects allow the user device 100 to determine whether there are any similarities between data samples, such as between two images that are different from each other in some respects but similar in other respects. For example, the user device 100 is able to determine that despite different lighting conditions, the same person is present in both images.

In addition, the user device 100 is able to determine a degree of similarity that quantifies how similar different data samples are to one another. Implementing a correlithm object processing system in the user device 100 improves the operation of the user device 100 when comparing data sets and identifying matches by allowing the user device 100 to perform non-binary comparisons between data sets and to quantify the similarity between different data samples. In addition, using a correlithm object processing system results in increased flexibility and faster search times when comparing data samples or data sets. Thus, implementing a correlithm object processing system in the user device 100 provides a technical solution to a problem necessarily rooted in computer technologies.

The ability to implement a correlithm object processing system provides a technical advantage by allowing the system to identify and compare data samples regardless of whether an exact match has been previous observed or stored. In other words, using the correlithm object processing system the user device 100 is able to identify similar data samples to an input data sample in the absence of an exact match. This functionality is unique and distinct from conventional computers that can only identify data samples with exact matches.

Examples of data samples include, but are not limited to, images, files, text, audio signals, biometric signals, electric signals, or any other suitable type of data. A correlithm object 104 is a point in the n-dimensional space 102, sometimes called an "n-space." The value of 'n' represents the number of dimensions of the space. For example, an n-dimensional space 102 may be a 3-dimensional space, a 50-dimensional space, a 100-dimensional space, or any other suitable dimension space. The number of dimensions depends on its ability to support certain statistical tests, such as the distances between pairs of randomly chosen points in the space approximating a normal distribution. In some embodiments, increasing the number of dimensions in the n-dimensional space 102 modifies the statistical properties of the system to provide improved results. Increasing the number of dimensions increases the probability that a correlithm object 104 is similar to other adjacent correlithm objects 104. In other words, increasing the number of dimensions increases the correlation between how close a pair of correlithm objects 104 are to each other and how similar the correlithm objects 104 are to each other.

Correlithm object processing systems use new types of data structures called correlithm objects 104 that improve the way a device operates, for example, by enabling the device to perform non-binary data set comparisons and to quantify the similarity between different data samples. Correlithm objects 104 are data structures designed to improve the way a device stores, retrieves, and compares data samples in memory. Unlike conventional data structures, correlithm objects 104 are data structures where objects can be expressed in a high-dimensional space such that distance 106 between points in the space represent the similarity between different objects or data samples. In other words, the distance 106 between a pair of correlithm objects 104 in the n-dimensional space 102 indicates how similar the correlithm objects 104 are from each other and the data samples they represent. Correlithm objects 104 that are close to each other are more similar to each other than correlithm objects 104 that are further apart from each other. For example, in a facial recognition application, correlithm objects 104 used to represent images of different types of glasses may be relatively close to each other compared to correlithm objects 104 used to represent images of other features such as facial hair. An exact match between two data samples occurs when their corresponding correlithm objects 104 are the same or have no distance between them. When two data samples are not exact matches but are similar, the distance between their correlithm objects 104 can be used to indicate their similarities. In other words, the distance 106 between correlithm objects 104 can be used to identify both data samples that exactly match each other as well as data samples that do not match but are similar. This feature is unique to a correlithm processing system and is unlike conventional computers that are unable to detect when data samples are different but similar in some aspects.

Correlithm objects 104 also provide a data structure that is independent of the data type and format of the data samples they represent. Correlithm objects 104 allow data samples to be directly compared regardless of their original data type and/or format. In some instances, comparing data samples as correlithm objects 104 is computationally more efficient and faster than comparing data samples in their original format. For example, comparing images using conventional data structures involves significant amounts of image processing which is time consuming and consumes processing resources. Thus, using correlithm objects 104 to represent data samples provides increased flexibility and improved performance compared to using other conventional data structures.

In one embodiment, correlithm objects 104 may be represented using categorical binary strings. The number of bits used to represent the correlithm object 104 corresponds with the number of dimensions of the n-dimensional space 102 where the correlithm object 102 is located. For example, each correlithm object 104 may be uniquely identified using a 64-bit string in a 64-dimensional space 102. In other examples, correlithm objects 104 can be identified using any other suitable number of bits in a string. In this configuration, the distance 106 between two correlithm objects 104 can be determined based on the differences between the bits of the two correlithm objects 104. In other words, the distance 106 between two correlithm objects can be determined based on how many individual bits differ between the correlithm objects 104. The distance 106 between two correlithm objects 104 can be computed using hamming distance or any other suitable technique. An example of a process for computing the distance between a pair of correlithm objects 104 is described in FIGS. 6A, 6B, 7A, and 7B.

In another embodiment, the distance 106 between two correlithm objects 104 can be determined using a Minkowski distance such as the Euclidean or "straight-line" distance between the correlithm objects 104. For example, the distance 106 between a pair of correlithm objects 104 may be determined by calculating the square root of the sum of squares of the coordinate difference in each dimension.

The user device 100 is configured to implement or emulate a correlithm object processing system that comprises one or more sensors 302, nodes 304, and/or actors 306 in order to convert data samples between real world values or representations and to correlithm objects 104 in a correlithm object domain. Sensors 302 are generally configured to convert real world data samples to the correlithm object domain. Nodes 304 are generally configured to process or perform various operations on correlithm objects in the correlithm object domain. Actors 306 are generally configured to convert correlithm objects 104 into real world values or representations. Additional information about sensors 302, nodes 304, and actors 306 is described in FIG. 3.

Performing operations using correlithm objects 104 in a correlithm object domain allows the user device 100 to identify relationships between data samples that cannot be identified using conventional data processing systems. For example, in the correlithm object domain, the user device 100 is able to identify not only data samples that exactly match an input data sample, but also other data samples that have similar characteristics or features as the input data samples. Conventional computers are unable to identify these types of relationships readily. Using correlithm objects 104 improves the operation of the user device 100 by enabling the user device 100 to efficiently process data samples and identify relationships between data samples without relying on signal processing techniques that require a significant amount of processing resources. These benefits allow the user device 100 to operate more efficiently than conventional computers by reducing the amount of processing power and resources that are needed to perform various operations.

Figure 2:
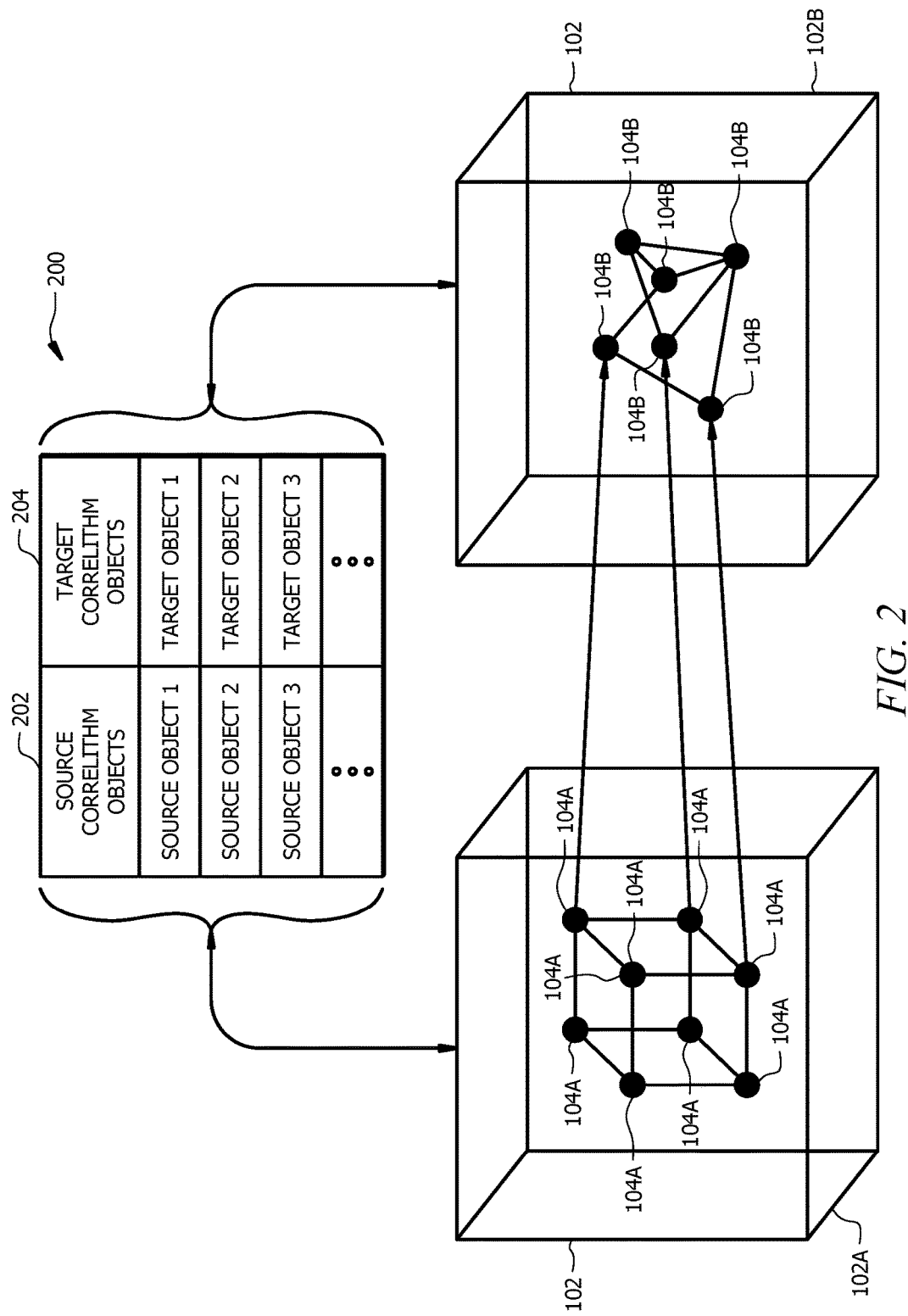
FIG. 2 is a perspective view of an embodiment of a mapping between correlithm objects in different n-dimensional spaces.

FIG. 2 is a schematic view of an embodiment of a mapping between correlithm objects 104 in different n-dimensional spaces 102. When implementing a correlithm object processing system, the user device 100 performs operations within the correlithm object domain using correlithm objects 104 in different n-dimensional spaces 102. As an example, the user device 100 may convert different types of data samples having real world values into correlithm objects 104 in different n-dimensional spaces 102. For instance, the user device 100 may convert data samples of text into a first set of correlithm objects 104 in a first n-dimensional space 102 and data samples of audio samples as a second set of correlithm objects 104 in a second n-dimensional space 102. Conventional systems require data samples to be of the same type and/or format in order to perform any kind of operation on the data samples. In some instances, some types of data samples cannot be compared because there is no common format available. For example, conventional computers are unable to compare data samples of images and data samples of audio samples because there is no common format. In contrast, the user device 100 implementing a correlithm object processing system is able to compare and perform operations using correlithm objects 104 in the correlithm object domain regardless of the type or format of the original data samples.

In FIG. 2, a first set of correlithm objects 104A are defined within a first n-dimensional space 102A and a second set of correlithm objects 104B are defined within a second n-dimensional space 102B. The n-dimensional spaces may have the same number dimensions or a different number of dimensions. For example, the first n-dimensional space 102A and the second n-dimensional space 102B may both be three dimensional spaces. As another example, the first n-dimensional space 102A may be a three dimensional space and the second n-dimensional space 102B may be a nine dimensional space. Correlithm objects 104 in the first n-dimensional space 102A and second n-dimensional space 102B are mapped to each other. In other words, a correlithm object 104A in the first n-dimensional space 102A may reference or be linked with a particular correlithm object 104B in the second n-dimensional space 102B. The correlithm objects 104 may also be linked with and referenced with other correlithm objects 104 in other n-dimensional spaces 102.

In one embodiment, a data structure such as table 200 may used to map or link correlithm objects 194 in different n-dimensional spaces 102. In some instances, table 200 is referred to as a node table. Table 200 is generally configured to identify a first plurality of correlithm objects 104 in a first n-dimensional space 102 and a second plurality of correlithm objects 104 in a second n-dimensional space 102. Each correlithm object 104 in the first n-dimensional space 102 is linked with a correlithm object 104 is the second n-dimensional space 102. For example, table 200 may be configured with a first column 202 that lists correlithm objects 104A as source correlithm objects and a second column 204 that lists corresponding correlithm objects 104B as target correlithm objects. In other examples, table 200 may be configured in any other suitable manner or may be implemented using any other suitable data structure. In some embodiments, one or more mapping functions may be used to convert between a correlithm object 104 in a first n-dimensional space and a correlithm object 104 is a second n-dimensional space.

Figure 3:
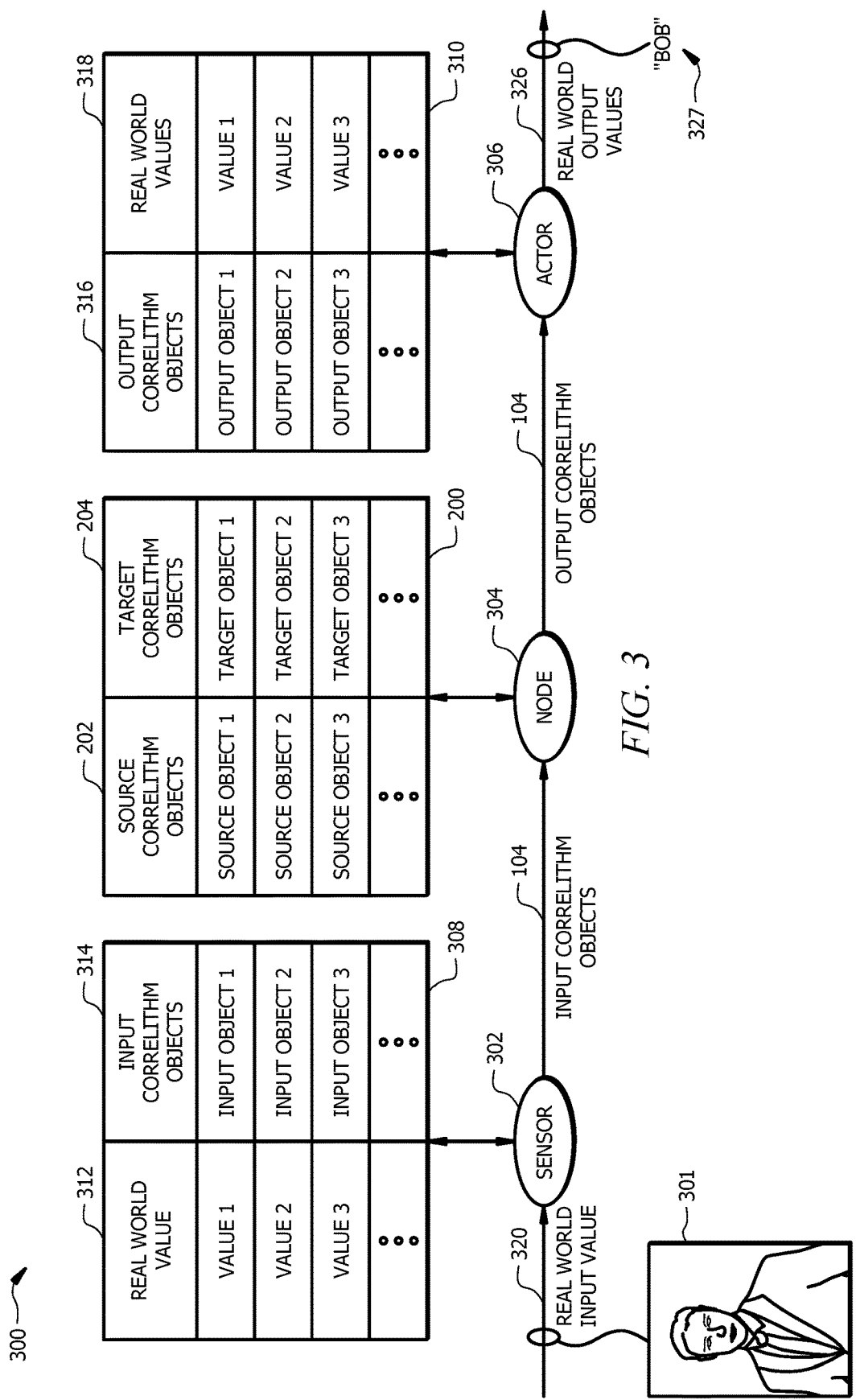
FIG. 3 is a schematic view of an embodiment of a correlithm object processing system.

FIG. 3 is a schematic view of an embodiment of a correlithm object processing system 300 that is implemented by a user device 100 to perform operations using correlithm objects 104. The system 300 generally comprises a sensor 302, a node 304, and an actor 306. The system 300 may be configured with any suitable number and/or configuration of sensors 302, nodes 304, and actors 306. An example of the system 300 in operation is described in FIG. 4. In one embodiment, a sensor 302, a node 304, and an actor 306 may all be implemented on the same device (e.g. user device 100). In other embodiments, a sensor 302, a node 304, and an actor 306 may each be implemented on different devices in signal communication with each other for example over a network. In other embodiments, different devices may be configured to implement any combination of sensors 302, nodes 304, and actors 306.

Sensors 302 serve as interfaces that allow a user device 100 to convert real world data samples into correlithm objects 104 that can be used in the correlithm object domain. Sensors 302 enable the user device 100 compare and perform operations using correlithm objects 104 regardless of the data type or format of the original data sample. Sensors 302 are configured to receive a real world value 320 representing a data sample as an input, to determine a correlithm object 104 based on the real world value 320, and to output the correlithm object 104. For example, the sensor 302 may receive an image 301 of a person and output a correlithm object 322 to the node 304 or actor 306. In one embodiment, sensors 302 are configured to use sensor tables 308 that link a plurality of real world values with a plurality of correlithm objects 104 in an n-dimensional space 102. Real world values are any type of signal, value, or representation of data samples. Examples of real world values include, but are not limited to, images, pixel values, text, audio signals, electrical signals, and biometric signals. As an example, a sensor table 308 may be configured with a first column 312 that lists real world value entries corresponding with different images and a second column 314 that lists corresponding correlithm objects 104 as input correlithm objects. In other examples, sensor tables 308 may be configured in any other suitable manner or may be implemented using any other suitable data structure. In some embodiments, one or more mapping functions may be used to translate between a real world value 320 and a correlithm object 104 is a n-dimensional space. Additional information for implementing or emulating a sensor 302 in hardware is described in FIG. 5.

Nodes 304 are configured to receive a correlithm object 104 (e.g. an input correlithm object 104), to determine another correlithm object 104 based on the received correlithm object 104, and to output the identified correlithm object 104 (e.g. an output correlithm object 104). In one embodiment, nodes 304 are configured to use node tables 200 that link a plurality of correlithm objects 104 from a first n-dimensional space 102 with a plurality of correlithm objects 104 in a second n-dimensional space 102. A node table 200 may be configured similar to the table 200 described in FIG. 2. Additional information for implementing or emulating a node 304 in hardware is described in FIG. 5.

Actors 306 serve as interfaces that allow a user device 100 to convert correlithm objects 104 in the correlithm object domain back to real world values or data samples. Actors 306 enable the user device 100 to convert from correlithm objects 104 into any suitable type of real world value. Actors 306 are configured to receive a correlithm object 104 (e.g. an output correlithm object 104), to determine a real world output value 326 based on the received correlithm object 104, and to output the real world output value 326. The real world output value 326 may be a different data type or representation of the original data sample. As an example, the real world input value 320 may be an image 301 of a person and the resulting real world output value 326 may be text 327 and/or an audio signal identifying the person. In one embodiment, actors 306 are configured to use actor tables 310 that link a plurality of correlithm objects 104 in an n-dimensional space 102 with a plurality of real world values. As an example, an actor table 310 may be configured with a first column 316 that lists correlithm objects 104 as output correlithm objects and a second column 318 that lists real world values. In other examples, actor tables 310 may be configured in any other suitable manner or may be implemented using any other suitable data structure. In some embodiments, one or more mapping functions may be employed to translate between a correlithm object 104 in an n-dimensional space and a real world output value 326. Additional information for implementing or emulating an actor 306 in hardware is described in FIG. 5.

A correlithm object processing system 300 uses a combination of a sensor table 308, a node table 200, and/or an actor table 310 to provide a specific set of rules that improve computer-related technologies by enabling devices to compare and to determine the degree of similarity between different data samples regardless of the data type and/or format of the data sample they represent. The ability to directly compare data samples having different data types and/or formatting is a new functionality that cannot be performed using conventional computing systems and data structures. Conventional systems require data samples to be of the same type and/or format in order to perform any kind of operation on the data samples. In some instances, some types of data samples are incompatible with each other and cannot be compared because there is no common format available. For example, conventional computers are unable to compare data samples of images with data samples of audio samples because there is no common format available. In contrast, a device implementing a correlithm object processing system uses a combination of a sensor table 308, a node table 200, and/or an actor table 310 to compare and perform operations using correlithm objects 104 in the correlithm object domain regardless of the type or format of the original data samples. The correlithm object processing system 300 uses a combination of a sensor table 308, a node table 200, and/or an actor table 310 as a specific set of rules that provides a particular solution to dealing with different types of data samples and allows devices to perform operations on different types of data samples using correlithm objects 104 in the correlithm object domain. In some instances, comparing data samples as correlithm objects 104 is computationally more efficient and faster than comparing data samples in their original format. Thus, using correlithm objects 104 to represent data samples provides increased flexibility and improved performance compared to using other conventional data structures. The specific set of rules used by the correlithm object processing system 300 go beyond simply using routine and conventional activities in order to achieve this new functionality and performance improvements.

In addition, correlithm object processing system 300 uses a combination of a sensor table 308, a node table 200, and/or an actor table 310 to provide a particular manner for transforming data samples between ordinal number representations and correlithm objects 104 in a correlithm object domain. For example, the correlithm object processing system 300 may be configured to transform a representation of a data sample into a correlithm object 104, to perform various operations using the correlithm object 104 in the correlithm object domain, and to transform a resulting correlithm object 104 into another representation of a data sample. Transforming data samples between ordinal number representations and correlithm objects 104 involves fundamentally changing the data type of data samples between an ordinal number system and a categorical number system to achieve the previously described benefits of the correlithm object processing system 300.

Figure 4:
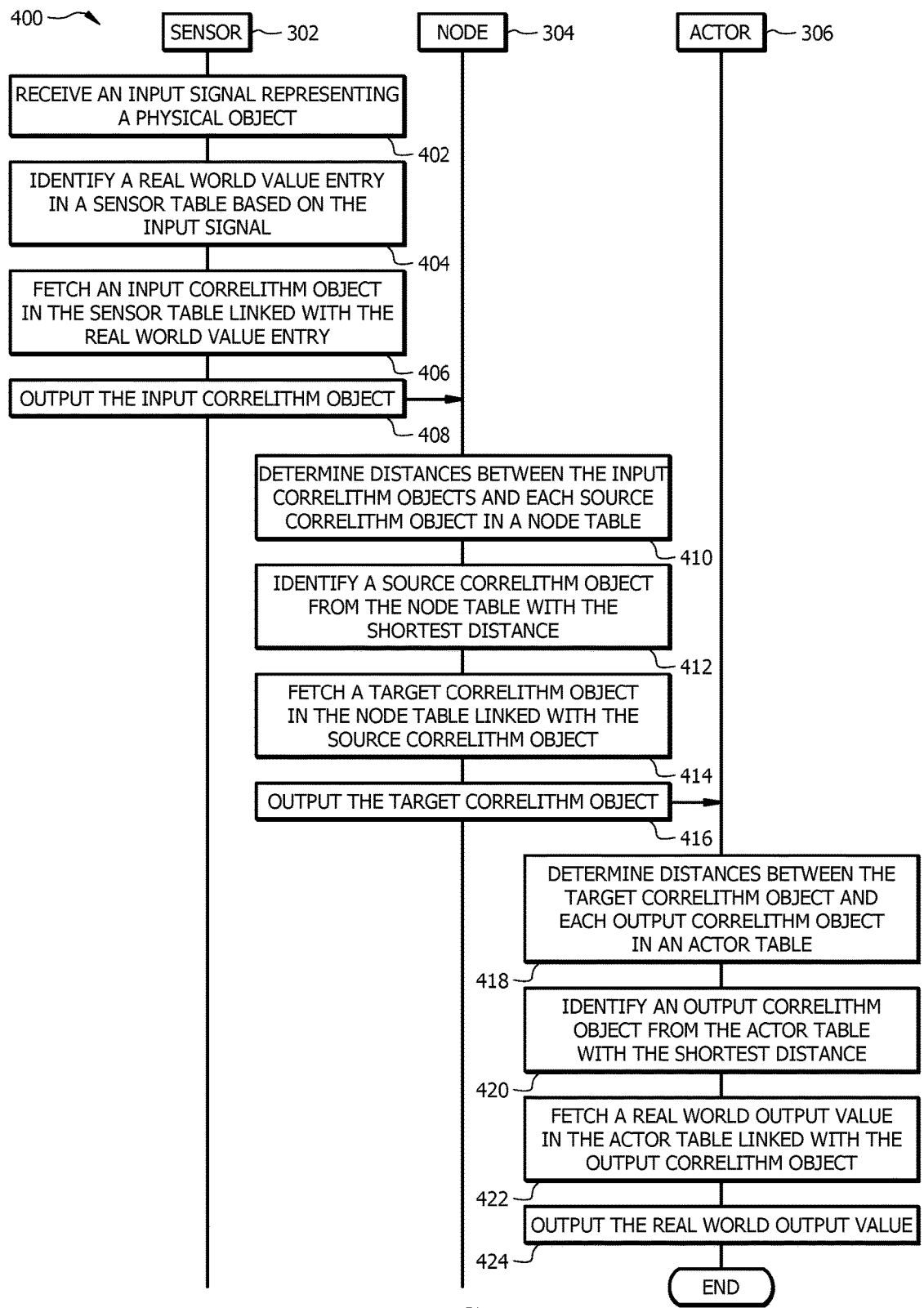
FIG. 4 is a protocol diagram of an embodiment of a correlithm object process flow.

FIG. 4 is a protocol diagram of an embodiment of a correlithm object process flow 400. A user device 100 implements process flow 400 to emulate a correlithm object processing system 300 to perform operations using correlithm object 104 such as facial recognition. The user device 100 implements process flow 400 to compare different data samples (e.g. images, voice signals, or text) are to each other and to identify other objects based on the comparison. Process flow 400 provides instructions that allows user devices 100 to achieve the improved technical benefits of a correlithm object processing system 300.

Conventional systems are configured to use ordinal numbers for identifying different data samples. Ordinal based number systems only provide information about the sequence order of numbers based on their numeric values, and do not provide any information about any other types of relationships for the data samples being represented by the numeric values such as similarity. In contrast, a user device 100 can implement or emulate the correlithm object processing system 300 which provides an unconventional solution that uses categorical numbers and correlithm objects 104 to represent data samples. For example, the system 300 may be configured to use binary integers as categorical numbers to generate correlithm objects 104 which enables the user device 100 to perform operations directly based on similarities between different data samples. Categorical numbers provide information about how similar different data sample are from each other. Correlithm objects 104 generated using categorical numbers can be used directly by the system 300 for determining how similar different data samples are from each other without relying on exact matches, having a common data type or format, or conventional signal processing techniques.

A non-limiting example is provided to illustrate how the user device 100 implements process flow 400 to emulate a correlithm object processing system 300 to perform facial recognition on an image to determine the identity of the person in the image. In other examples, the user device 100 may implement process flow 400 to emulate a correlithm object processing system 300 to perform voice recognition, text recognition, or any other operation that compares different objects.

At step 402, a sensor 302 receives an input signal representing a data sample. For example, the sensor 302 receives an image of person's face as a real world input value 320. The input signal may be in any suitable data type or format. In one embodiment, the sensor 302 may obtain the input signal in real-time from a peripheral device (e.g. a camera). In another embodiment, the sensor 302 may obtain the input signal from a memory or database.

At step 404, the sensor 302 identifies a real world value entry in a sensor table 308 based on the input signal. In one embodiment, the system 300 identifies a real world value entry in the sensor table 308 that matches the input signal. For example, the real world value entries may comprise previously stored images. The sensor 302 may compare the received image to the previously stored images to identify a real world value entry that matches the received image. In one embodiment, when the sensor 302 does not find an exact match, the sensor 302 finds a real world value entry that closest matches the received image.

At step 406, the sensor 302 identifies and fetches an input correlithm object 104 in the sensor table 308 linked with the real world value entry. At step 408, the sensor 302 sends the identified input correlithm object 104 to the node 304. In one embodiment, the identified input correlithm object 104 is represented in the sensor table 308 using a categorical binary integer string. The sensor 302 sends the binary string representing to the identified input correlithm object 104 to the node 304.

At step 410, the node 304 receives the input correlithm object 104 and determines distances 106 between the input correlithm object 104 and each source correlithm object 104 in a node table 200. In one embodiment, the distance 106 between two correlithm objects 104 can be determined based on the differences between the bits of the two correlithm objects 104. In other words, the distance 106 between two correlithm objects can be determined based on how many individual bits differ between a pair of correlithm objects 104. The distance 106 between two correlithm objects 104 can be computed using hamming distance or any other suitable technique. An example of a distance measuring process for a pair of correlithm objects 104 is described in FIGS. 7A and 7B. In another embodiment, the distance 106 between two correlithm objects 104 can be determined using a Minkowski distance such as the Euclidean or "straight-line" distance between the correlithm objects 104. For example, the distance 106 between a pair of correlithm objects 104 may be determined by calculating the square root of the sum of squares of the coordinate difference in each dimension.

At step 412, the node 304 identifies a source correlithm object 104 from the node table 200 with the shortest distance 106. A source correlithm object 104 with the shortest distance from the input correlithm object 104 is a correlithm object 104 either matches or most closely matches the received input correlithm object 104.

At step 414, the node 304 identifies and fetches a target correlithm object 104 in the node table 200 linked with the source correlithm object 104. At step 416, the node 304 outputs the identified target correlithm object 104 to the actor 306. In this example, the identified target correlithm object 104 is represented in the node table 200 using a categorical binary integer string. The node 304 sends the binary string representing to the identified target correlithm object 104 to the actor 306.

At step 418, the actor 306 receives the target correlithm object 104 and determines distances between the target correlithm object 104 and each output correlithm object 104 in an actor table 310. The actor 306 may compute the distances between the target correlithm object 104 and each output correlithm object 104 in an actor table 310 using a process similar to the process described in step 410.

At step 420, the actor 306 identifies an output correlithm object 104 from the actor table 310 with the shortest distance 106. An output correlithm object 104 with the shortest distance from the target correlithm object 104 is a correlithm object 104 either matches or most closely matches the received target correlithm object 104.

At step 422, the actor 306 identifies and fetches a real world output value in the actor table 310 linked with the output correlithm object 104. The real world output value may be any suitable type of data sample that corresponds with the original input signal. For example, the real world output value may be text that indicates the name of the person in the image or some other identifier associated with the person in the image. As another example, the real world output value may be an audio signal or sample of the name of the person in the image. In other examples, the real world output value may be any other suitable real world signal or value that corresponds with the original input signal. The real world output value may be in any suitable data type or format.

At step 424, the actor 306 outputs the identified real world output value. In one embodiment, the actor 306 may output the real world output value in real-time to a peripheral device (e.g. a display or a speaker). In one embodiment, the actor 306 may output the real world output value to a memory or database. In one embodiment, the real world output value is sent to another sensor 302. For example, the real world output value may be sent to another sensor 302 as an input for another process.

Figure 5:
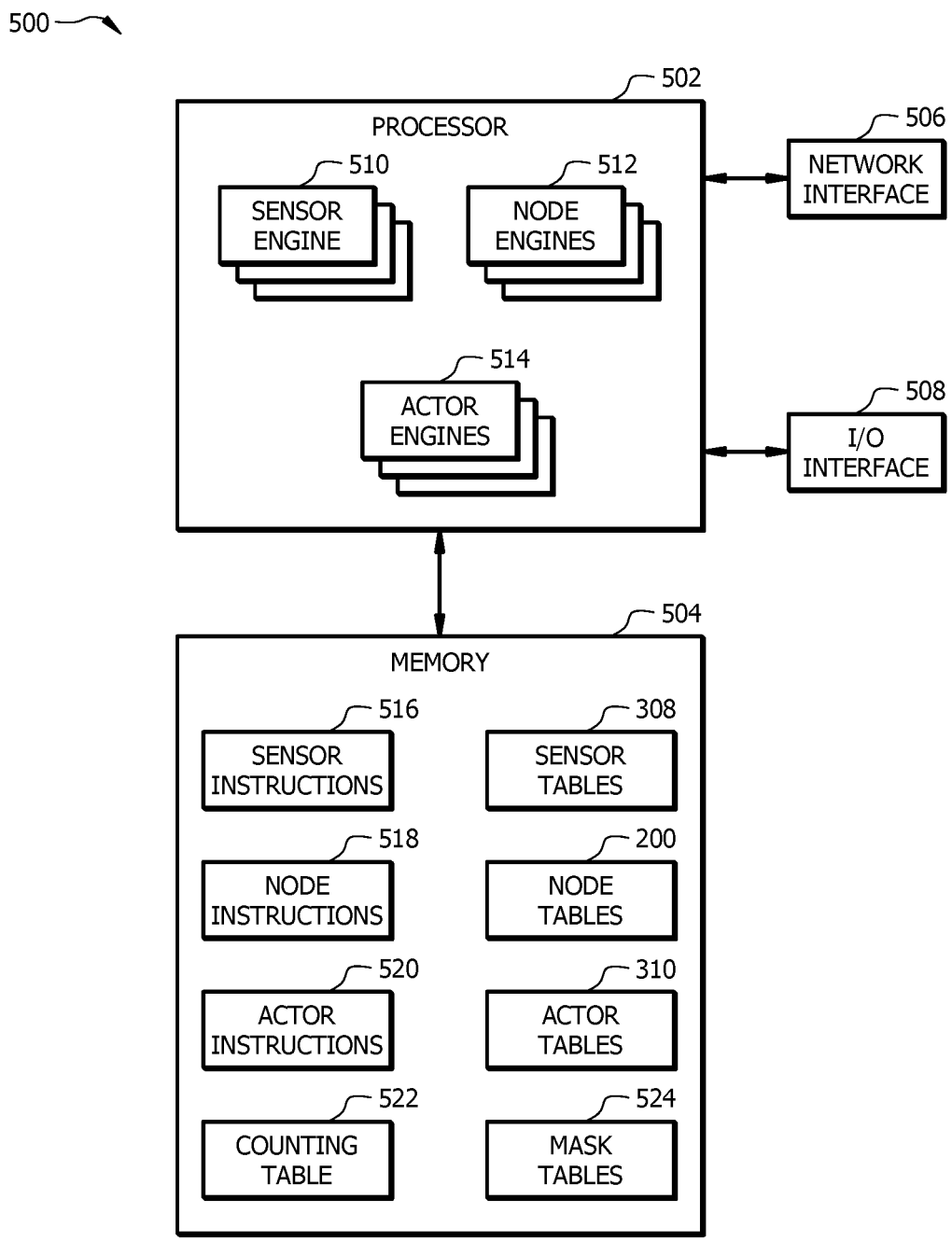
FIG. 5 is a schematic diagram of an embodiment a computer architecture for emulating a correlithm object processing system.

FIG. 5 is a schematic diagram of an embodiment a computer architecture 500 for emulating a correlithm object processing system 300 in a user device 100. The computer architecture 500 comprises a processor 502, a memory 504, a network interface 506, and an input-output (I/O) interface 508. The computer architecture 500 may be configured as shown or in any other suitable configuration.

The processor 502 comprises one or more processors operably coupled to the memory 504. The processor 502 is any electronic circuitry including, but not limited to, state machines, one or more central processing unit (CPU) chips, logic units, cores (e.g. a multi-core processor), field-programmable gate array (FPGAs), application specific integrated circuits (ASICs), graphics processing units (GPUs), or digital signal processors (DSPs). The processor 502 may be a programmable logic device, a microcontroller, a microprocessor, or any suitable combination of the preceding. The processor 502 is communicatively coupled to and in signal communication with the memory 204. The one or more processors are configured to process data and may be implemented in hardware or software. For example, the processor 502 may be 8-bit, 16-bit, 32-bit, 64-bit or of any other suitable architecture. The processor 502 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement sensor engines 510, node engines 512, and actor engines 514. In an embodiment, the sensor engines 510, the node engines 512, and the actor engines 514 are implemented using logic units, FPGAs, ASICs, DSPs, or any other suitable hardware. The sensor engines 510, the node engines 512, and the actor engines 514 are each configured to implement a specific set of rules or process that provides an improved technological result.

In one embodiment, the sensor engine 510 is configured to receive a real world value 320 as an input, to determine a correlithm object 104 based on the real world value 320, and to output the correlithm object 104. Examples of the sensor engine 510 in operation are described in FIGS. 4 and 8.

In one embodiment, the node engine 512 is configured to receive a correlithm object 104 (e.g. an input correlithm object 104), to determine another correlithm object 104 based on the received correlithm object 104, and to output the identified correlithm object 104 (e.g. an output correlithm object 104). The node engine 512 is also configured to compute distances between pairs of correlithm objects 104. Examples of the node engine 512 in operation are described in FIGS. 4, 7A, and 7B.

In one embodiment, the actor engine 514 is configured to receive a correlithm object 104 (e.g. an output correlithm object 104), to determine a real world output value 326 based on the received correlithm object 104, and to output the real world output value 326. Examples of the actor engine 514 in operation are described in FIGS. 4 and 11.

The memory 504 comprises one or more non-transitory disks, tape drives, or solid-state drives, and may be used as an over-flow data storage device, to store programs when such programs are selected for execution, and to store instructions and data that are read during program execution. The memory 504 may be volatile or non-volatile and may comprise read-only memory (ROM), random-access memory (RAM), ternary content-addressable memory (TCAM), dynamic random-access memory (DRAM), and static random-access memory (SRAM). The memory 504 is operable to store sensor instructions 516, node instructions 518, actor instructions 520, counting tables 522, sensor tables 308, node tables 200, actor tables 310, mask tables 524, and/or any other data or instructions. The sensor instructions 516, the node instructions 518, and the actor instructions 520 comprise any suitable set of instructions, logic, rules, or code operable to execute the sensor engine 510, node engine 512, and the actor engine 514, respectively.

The sensor tables 308, the node tables 200, and the actor tables 310 may be configured similar to the sensor tables 308, the node tables 200, and the actor tables 310 described in FIG. 3, respectively.

Counting tables 522 are configured to link a plurality of binary strings with a plurality of numeric values. In one embodiment, the numeric value identifies the number of bits set to a logical high or logical one in a corresponding binary string. For example, a binary string with eight bits set to a logical one will be linked with a numeric value of eight. As an example, a counting table 522 may be configured with a first column that lists binary strings as input values and a second column that lists numeric values as output values. In other examples, counting tables 522 may be configured in any other suitable manner or may be implemented using any other suitable data structure. An example of a counting table 522 in operation is described in FIGS. 6A and 7A.

Each mask table 524 is linked with a mask that defines an array of pixels in an image. In one embodiment, each mask at least partially overlaps with at least one other mask. In this configuration, each mask has at least one pixel in common with another mask. In other embodiments, the masks are configured to not overlap with other masks. In this configuration, the masks do not have any pixels in common with each other. Each mask table 524 identifies a plurality of correlithm object location indexes that are linked with a portion of an aggregated correlithm object. An aggregated correlithm object is a correlithm object 104 that is composed of a plurality of correlithm objects 104. For example, an aggregated correlithm object may be formed from five, ten, fifteen, or more correlithm objects 104. An aggregated correlithm object may be formed from any other suitable number of correlithm objects 104. As an example, a first correlithm object location index may be linked with a first correlithm object represented by the first 8-bits of an aggregated correlithm object, a second correlithm object location index is linked with a second correlithm object represented by the second 8-bits of the aggregated correlithm object, and so on. Each mask table 524 is further configured to link each of the plurality of correlithm object location indexes with a pixel location in a mask. For example, a mask table 524 may link a first portion of an aggregated correlithm object that defines a correlithm object 104 with the first pixel defined by the mask. An example of a mask table 524 in operation is described in FIGS. 10 and 11.

The network interface 506 is configured to enable wired and/or wireless communications. The network interface 506 is configured to communicate data with any other device or system. For example, the network interface 506 may be configured for communication with a modem, a switch, a router, a bridge, a server, or a client. The processor 502 is configured to send and receive data using the network interface 506.

The I/O interface 508 may comprise ports, transmitters, receivers, transceivers, or any other devices for transmitting and/or receiving data with peripheral devices as would be appreciated by one of ordinary skill in the art upon viewing this disclosure. For example, the I/O interface 508 may be configured to communicate data between the processor 502 and peripheral hardware such as a graphical user interface, a display, a mouse, a keyboard, a key pad, and a touch sensor (e.g. a touch screen).

When implementing a correlithm object processing system 300, user devices 100 measure the distance between different correlithm objects 104 to determine how similar the correlithm objects 104 and the data samples they represent are to each other. FIGS. 6A, 6B, 7A, and 7B described examples of distance measuring processes that can be implemented by a user device 100 to compute the distance between a pair of correlithm objects 104 in the correlithm object domain.

Figure 6A:
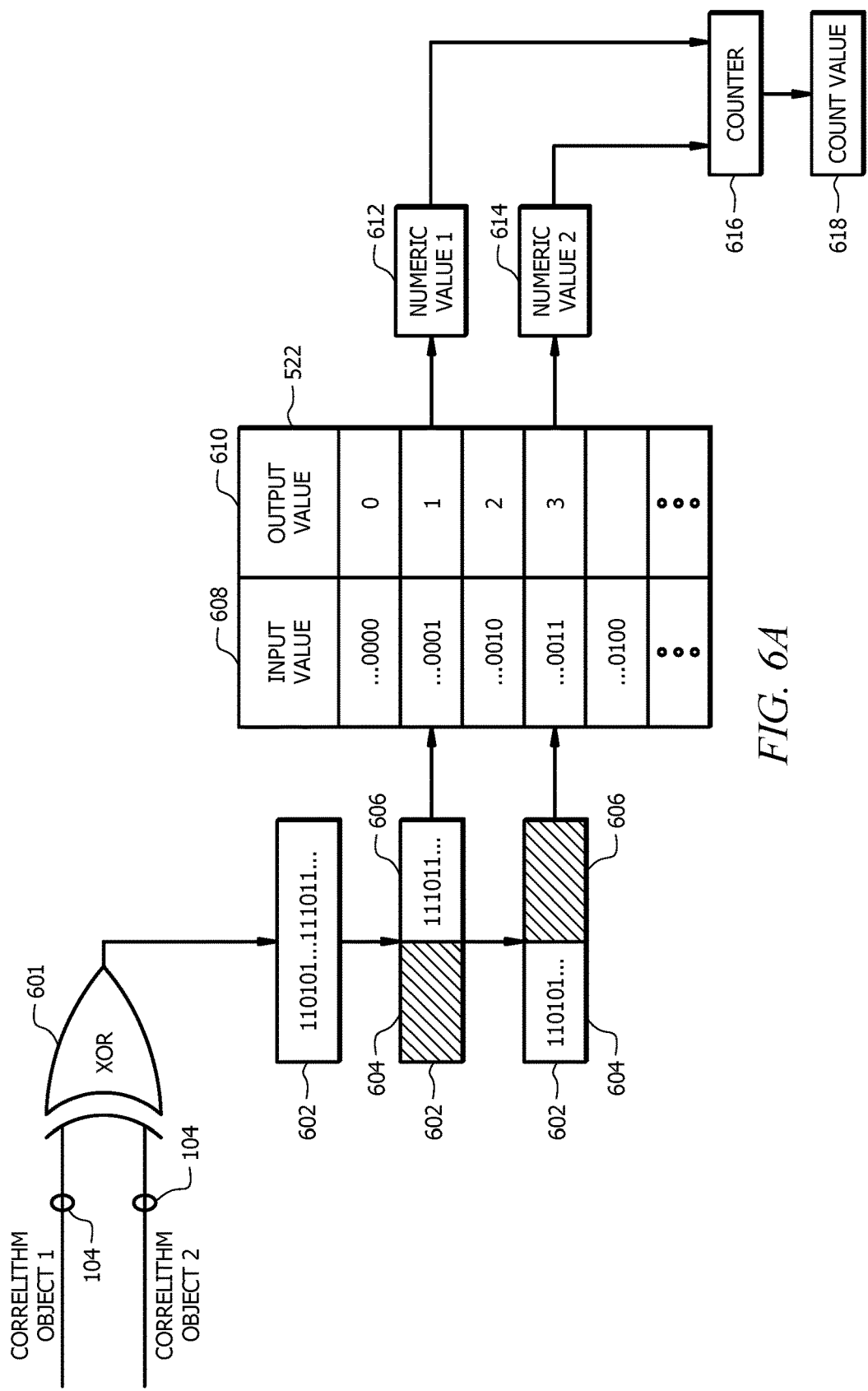
FIG. 6A is a schematic diagram of an embodiment of a distance measuring process for a correlithm object processing system.
Figure 7A:
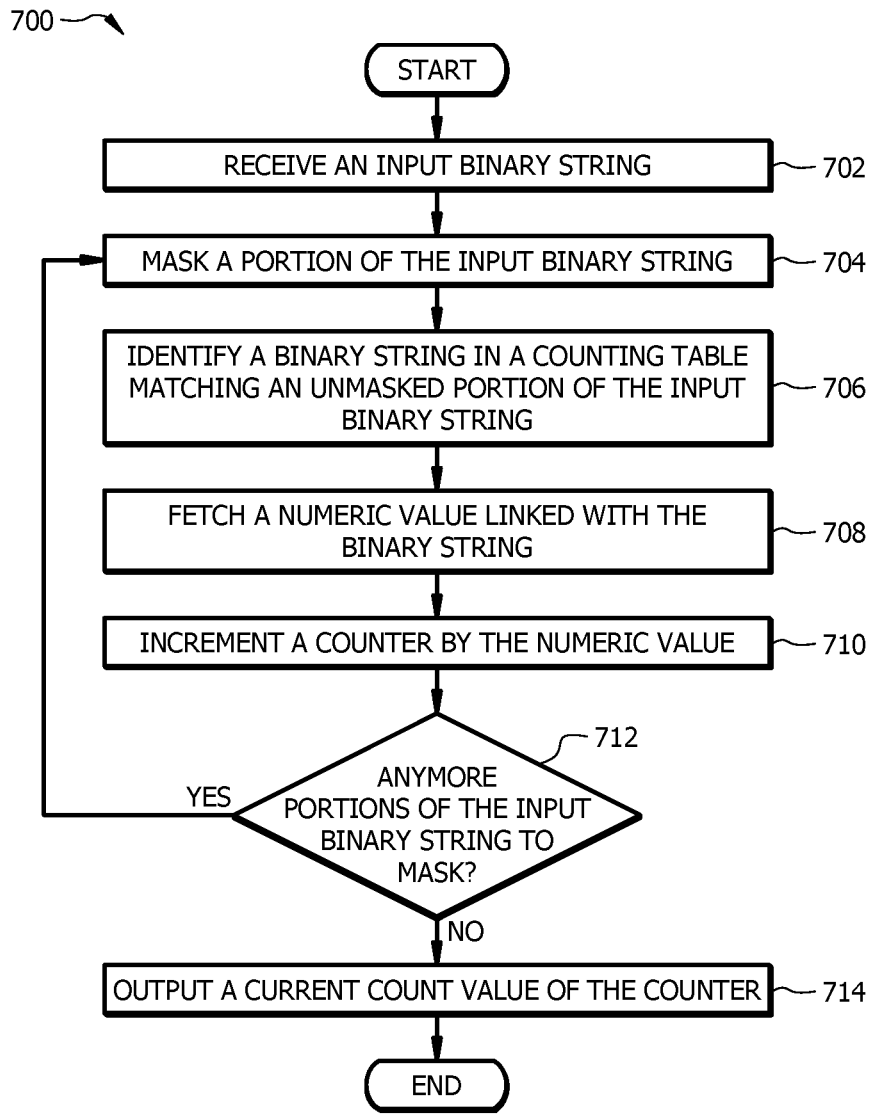
FIG. 7A is a flowchart of an embodiment of a distance measuring process flow.

FIGS. 6A and 7A combine to describe a distance measuring process for the correlithm object processing system 300. FIG. 6A is a schematic diagram of an embodiment of a distance measuring process for the correlithm object processing system 300. FIG. 7A is a flowchart of an embodiment of a distance measuring process flow 700. Process 700 provides instructions that allows user devices 100 to achieve the previously described improved technical benefits of a correlithm object processing system 300. The distance measuring process may be used by a node 304 or an actor 306 to determine the distance between a pair of correlithm objects 104. For example, a node 304 may implement process 700 to perform step 410 in FIG. 4. As another example, an actor 306 may implement process 700 to perform step 418 in FIG. 4. The distance between correlithm objects 104 is proportional to how similar the correlithm objects 104 and the objects they represent are to each other. The shorter the distance between a pair correlithm objects 104 indicates the more similar the correlithm objects 104 and the objects they represent are to each other.

In FIG. 7A at step 702, a node 304 receives an input binary string. For example, referring to FIG. 6A, an exclusive-or (XOR) logic gate 601 is connected to the node 304. In one embodiment, the XOR 601 or XOR functionality is integrated with the node 304. In other embodiments, the XOR 601 is a device external to the node 304. The XOR 601 is configured to receive a pair of correlithm objects 104, for example, as a pair of categorical binary integer strings. The output of the XOR 601 is passed to the node 304 as an input binary string 602. The input binary string may be any suitable length. For instance, the input binary string may be 16-bits, 32-bits, 64-bits, 128-bits, or any other suitable number of bits.

At step 704, the node 304 masks a portion of the input binary string. Referring to FIG. 6A, the node 304 masks a first portion 604 of the input binary string 602. When the node 304 masks the first portion 604 of the input binary string 602 at least a portion of the input binary string 602 not masked or modified. For example, the node 304 may mask a first portion 604 of the input binary string 602 and leaves a second portion 606 of the input binary string 602 unmasked. In one embodiment, the node 304 may use shift registers to extract the unmasked portion of the input binary string 602.

At step 706, the node 304 identifies a binary string in a counting table 522 matching an unmasked portion of the input binary string. In other words, the node 304 identifies an entry in the counting table 522 that matches the unmasked portion of the input binary string. The counting table 522 is configured similar to the counting table 522 described in FIG. 5. Referring to FIG. 6A, the node 304 identifies an input value entry 608 in the counting table 522 that matches the unmasked second portion 606 of the input binary string 602.

At step 708, the node 304 identifies and fetches a numeric value linked with the identified binary string in the counting table 522. Referring to FIG. 6A, the node 304 identifies an output value entry 610 in the counting table 522 that is linked with the identified input value entry 608.

At step 710, the node 304 increments a counter by the numeric value. In one embodiment, the counter or counter functionality may be integrated with the node 304. In other embodiments, the counter may be an external device connected to the node 304. Referring to FIG. 6A, the numeric value 612 of the identified output numeric value entry 610 in the counting table 522 is passed to a counter 616 that increments its current count value 618 by the numeric value 612. For example, when a numeric value 612 of seven is passed to the counter 616, the counter 616 will increase its current count value 618 by seven.

At step 712, the node 304 determines whether there are anymore portions of the input binary string to mask. The node 304 returns to step 704 when the node 304 determines there are more portions of the input binary string to mask. The node 304 proceeds to step 714 when the node 304 determines there are no more portions of the input binary string to mask.

Referring to FIG. 6A, after incrementing the counter 616 based on the unmasked second portion 606 of the input binary string 602, the node 304 returns to step 704 to process the first portion 604 of the input binary string 602 that was previously masked. In this example, the node 304 unmasks the first portion 604 of the input binary string 602 and masks the second portion 606 of the input binary string 602. The node 304 repeats the process of identifying an entry in the counting table 522 that matches the unmasked portion of the input binary string 602 and passing a corresponding numeric value 614 to the counter 616. The counter 616 increments its current count value 618 by the numeric value 614. This process may be repeated one or more times for any additional portions of the input binary string 602.

At step 714, the node 304 outputs the current count value 618 of the counter 616. The current count value 618 indicates the distance between the pair of correlithm objects 104 that were provided to the XOR 601. The current count value 618 may be used by nodes 304 and/or actor 306 to determine whether a received correlithm object 104 is similar to any of the previously known correlithm objects 104.

Figure 6B:
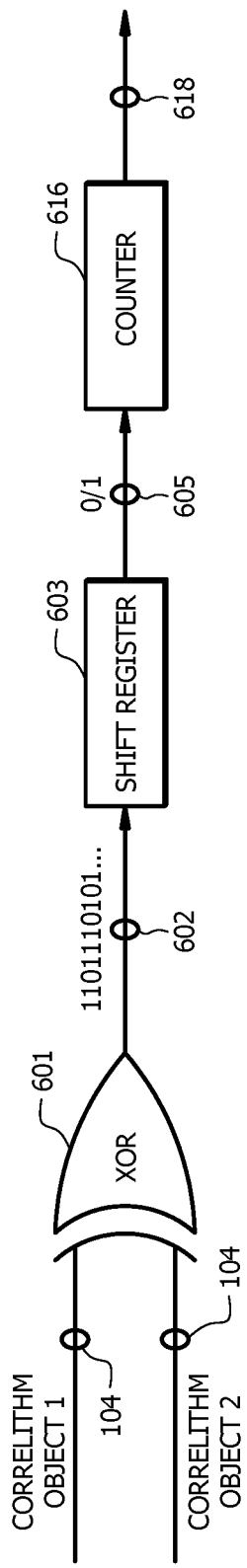
FIG. 6B is a schematic diagram of another embodiment of a distance measuring process for a correlithm object processing system based on hamming distances.
Figure 7B:
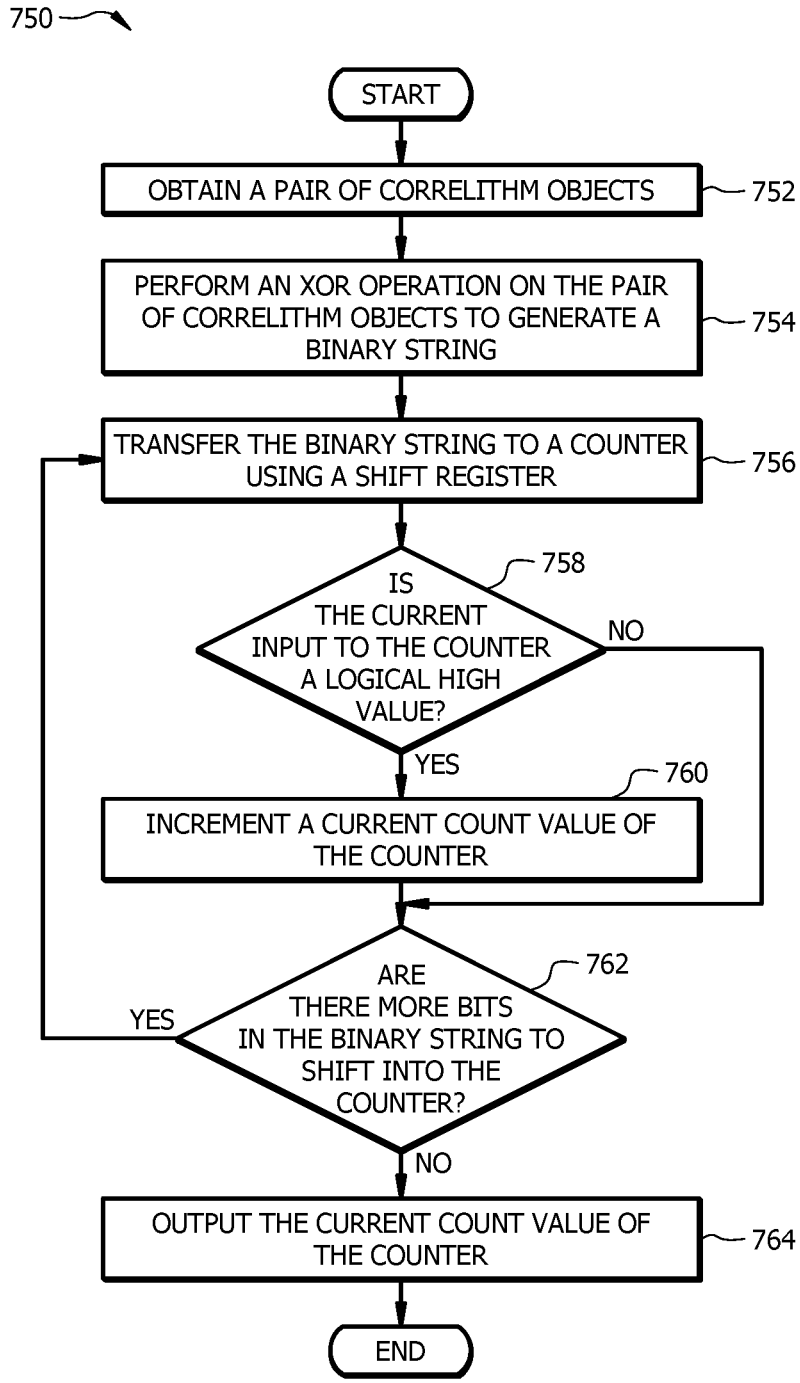
FIG. 7B is a flowchart of another embodiment of a distance measuring process flow based on hamming distances.

FIGS. 6B and 7B combine to describe another distance measuring process for a correlithm object processing system 300 based on hamming distances. FIG. 6B is a schematic diagram of another embodiment of a distance measuring process for a correlithm object processing system 300 based on hamming distances. FIG. 7B is a flowchart of another embodiment of a distance measuring process flow 750 based on hamming distances. Process 750 provides instructions that allows user devices 100 to achieve the previously described improved technical benefits of a correlithm object processing system 300. The distance measuring process described in FIG. 6B may be used by a node 304 or an actor 306 to determine the distance between a pair of correlithm objects 104. For example, a node 304 may implement the distance measuring process to perform step 410 in FIG. 4. As another example, an actor 306 may implement the distance measuring process to perform step 418 in FIG. 4.

In FIG. 7B at step 752, a node 304 obtains a pair of correlithm objects 104. The node 304 obtains the pair of correlithm objects 104 to compute the distance between the correlithm objects 104. As an example, the node 304 may receive one correlithm object 104 from a sensor 302, node 304, or actor 306 and one correlithm object 104 from a node table 200.

At step 754, the node 304 performs an XOR operation on the pair of correlithm objects to generate a binary string. Referring to FIG. 6B, an XOR 601 is connected to the node 304. In one embodiment, the XOR 601 or XOR functionality is integrated with the node 304. In other embodiments, the XOR 601 is a device external to the node 304. The XOR 601 is configured to receive the pair of correlithm objects 104 as a pair of categorical binary integer strings. The XOR 601 is configured to output a binary string 602. The binary string 602 may be any suitable length. For instance, the binary string 602 may be 16-bits, 32-bits, 64-bits, 128-bits, or any other suitable number of bits.

At step 756, the node 304 transfers the binary string to a counter using a shift register. Referring to FIG. 6B, the output of the XOR 601 is passed to a shift register 603 as a binary string 602. In one embodiment, the shift register 603 or binary data shifting functionality is integrated with the node 304. In other embodiments, the shift register 603 is a device external to the node 304. In one embodiment, the shift register 603 is configured transfer the binary string to the counter 616 one bit at a time.

At step 758, the node 304 determines whether the current input to the counter is a logical high value. For example, the node 304 determines whether the input bit 605 that is passed to the counter 616 is a logical high value (e.g. a logical one). The node 304 proceeds to step 760 in response to determining the current input to the counter is a logical high value.

The node 304 proceeds to step 762 in response to determining the current input to the counter in not a logical high value. In other words, the node proceeds to step 762 in response to determining the input to the counter is a logical low value (e.g. a logical zero).

At step 760, the node 304 increments a current count value of the counter. In other words, the node 304 adds one to the current count value of the counter when the input bit 605 that is passed to the counter 616 is a logical high value. In one embodiment, the counter or counter functionality may be integrated with the node 304. In other embodiments, the counter may be an external device connected to the node 304.

At step 762, the node 304 determines whether there are any more bits in the binary string to shift into the counter. The node 304 returns to step 756 in response to determining there are more bits in the binary string to shift into the counter. The node 304 proceeds to step 764 in response to determining there are no more bits in the binary string to shift into the counter.

At step 764, the node 304 outputs the current count value of the counter. The current count value 618 indicates the distance between the pair of correlithm objects 104 that were provided to the XOR 601. The current count value 618 may be used by nodes 304 and/or actor 306 to determine whether a received correlithm object 104 is similar to any of the previously known correlithm objects 104.

When implementing a correlithm object processing system 300, user devices 100 implement various types of sensors 302 and actors 304 in order to convert real world data samples into and out of the correlithm object domain. Examples of sensors 302 and actors 306 that are implemented by a user device 100 to convert images into correlithm objects 104 and to convert correlithm objects 104 into other types of data sample representations are described in FIGS. 8-11.

FIGS. 8 and 9 combine to describe a process for using a sensor 302 to emulate an image input adapter for the correlithm object processing system 300. FIG. 8 is a schematic diagram of an embodiment of a process for emulating an image input adapter for the correlithm object processing system 300 using a sensor 302. FIG. 9 is a flowchart of an embodiment of an image input adapting emulation method 900. Method 900 provides instructions that allows user devices 100 to achieve the previously described improved technical benefits of a correlithm object processing system 300. An image input adapter is generally configured to convert an image to a correlithm object 104. Once an image is converted to a correlithm object 104, the correlithm object 104 can be used for other processes or applications in the correlithm object domain by a node 304 and/or an actor 306 such as facial recognition.

In FIG. 9 at step 902, a sensor 302 receives an image formed by an array of pixels. For example, referring to FIG. 8, the sensor 302 receives image 802 which is made up of an array of pixels 804. The image may comprise any number of pixels 804. The image 802 may be any suitable data type or format. In one embodiment, the sensor 302 may obtain the image 802 in real-time from a peripheral device (e.g. a camera). In another embodiment, the sensor 302 may obtain the image 802 from a memory or database.

At step 904, the sensor 302 determines the dimensions of the array of pixels. In other words, the sensor 302 determines the size of the image in terms of pixels. For example, the sensor 302 may determine the image is a 10 by 10 array of pixels. The sensor 302 may employ any suitable technique for determining the size of the image.

At step 906, the sensor 302 defines a plurality of masks. The masks may be configured similar to the masks described in FIG. 5. In one embodiment, each mask at least partially overlaps with at least one other mask. In this configuration, each mask has at least one pixel in common with another mask. In other embodiments, the masks are configured to not overlap with other masks. In this configuration, the masks do not have any pixels in common with each other.

At step 908, the sensor 302 overlays the plurality of masks with the image to partition the image into a plurality of sub-arrays of pixels. Referring to FIG. 8, a mask 806 is overlaid with the image 802 to define a sub-array of pixels 807. In one embodiment, the plurality of masks may be overlaid with the image simultaneously to partition the image into a plurality of sub-arrays of pixels. In another embodiment, the masks may be overlaid with the image sequentially such that less than all of the masks are overlaid with the image at any given time. For example, the sensor 302 may apply one mask at a time with the image.

At step 910, the sensor 302 determines binary values for each pixel in a sub-array of pixels. Referring to FIG. 8, the sub-array of pixels 807 defined by the mask 806 is initially populated with different pixel values that each describe the color (e.g. red-green-blue (RGB) color) or intensity of a pixel in the sub-array of pixels. The pixel values may be in any number units such as decimal. The sensor 302 converts the sub-array of pixels 807 with pixel values to a sub-array of pixels 808 where each pixel value is described as a binary string. In one embodiment, the sensor 302 converts the pixel values to a correlithm object 104 represented as a categorical binary string using a sensor table 308. The sensor 302 may use a process similar to the process described in steps 402-406 in FIG. 4 to convert from pixel values to correlithm objects 104. In other embodiments, the sensor 302 converts the pixel values to binary strings using any other suitable technique.

At step 912, the sensor 302 serialize the correlithm objects 104 for the sub-array of pixels to form an aggregated correlithm object for the sub-array of pixels. Referring to FIG. 8, the sensor 302 serializes the correlithm objects 104 of the sub-array of pixels 808 to generate an aggregated correlithm object 810. In other words, the sensor 302 sequentially appends the binary values of the correlithm objects 104 for each pixel in the sub-array of pixels 808 to form the aggregated correlithm object 810.

At step 914, the sensor 302 determines whether to generate an aggregated correlithm object for another sub-array of pixels. The sensor 302 returns to step 910 when the sensor 302 determines to generate more aggregated correlithm objects. The sensor 302 proceeds to step 916 when the sensor 302 determines to not generate anymore aggregated correlithm objects 104. The sensor 302 returns to step 910 for each mask to repeat the process of converting sub-arrays of pixels with pixel values to sub-arrays of pixels where each pixel value is described as a correlithm object 104. The sensor 302 also repeats the process of serializing binary strings of correlithm objects 104 to generate an aggregated correlithm object for a mask. The sensor 302 proceeds to step 916 when the sensor 302 has completed converting the image into a plurality of aggregated correlithm objects.

At step 916, the sensor 302 outputs the aggregated correlithm objects. Each aggregated correlithm object is a categorical binary integer string. The sensor 302 sends the binary string representing to the aggregated correlithm object to a node 304 and/or an actor 306 for further processing. In some embodiments, the sensor 302 outputs the aggregated correlithm object to a memory.

FIGS. 10 and 11 combine to describe a process for using an actor 306 to emulate an image output adapter for the correlithm object processing system 300. FIG. 10 is a schematic diagram of an embodiment of a process for emulating an image output adapter for a correlithm object processing system 300 using an actor 306. FIG. 11 is a flowchart of an embodiment of an image output adapter emulation method 1100. Method 1100 provides instructions that allows user devices 100 to achieve the previously described improved technical benefits of a correlithm object processing system 300. An image output adapter is generally configured to convert a correlithm object 104 to an image or a representation of an image. For example, the actor 306 may generate an image based on the correlithm object 104. As another example, the actor 306 may generate a voice sample that identifies the image and/or elements in the image. As another example, the actor 306 may generate a text description of the image and/or elements in the image.

In FIG. 11 at step 1102, an actor 306 receives an aggregated correlithm object corresponding with a mask. For example, referring to FIG. 10, the actor 306 receives an aggregated correlithm object 810 that is composed of a plurality of correlithm objects 104. The actor 306 may receive the aggregated correlithm object 810 from either a sensor 302 or a node 304.

At step 1104, the actor 306 identifies the plurality of correlithm objects 104 in the aggregated correlithm object. The actor 306 may parse out or identify each of the correlithm objects 104 within the aggregated correlithm object.

At step 1106, the actor 306 populates each pixel location in a mask with a correlithm object 104 from the plurality of correlithm objects 104. Referring to FIG. 10, the actor 306 uses a mask table 524 to identify a sub-array of pixels that is defined by a corresponding mask 806 in the image 802. The actor 306 populates each pixel in the sub-array of pixels 808 with one of the correlithm objects 104 obtained from the aggregated correlithm object 810.

At step 1108, the actor 306 determines a pixel value for each pixel location in the mask based on the correlithm object 104 at each pixel location. Referring to FIG. 10, the actor 306 converts each binary string or correlithm object 104 at each pixel location into a corresponding pixel value. In one embodiment, the actor 306 converts each binary string or correlithm object 104 at each pixel location into a corresponding pixel value using an actor table 310. The actor 306 may use a process similar to the process described in steps 418-422 in FIG. 4 to convert from correlithm objects 104 to pixels values.

At step 1110, the actor 306 outputs a representation of a portion of the image based on the mask populated with pixel values at each pixel location. Referring to FIG. 10, the actor 306 may output the sub-array of pixels 807 that is populated with pixel values. For example, the actor 306 may generate a portion of image based on the sub-array of pixels 807. In one embodiment, the actor 306 may output the sub-array of pixels 807 in real-time to a peripheral device (e.g. a display). In one embodiment, the actor 306 may output the sub-array of pixels 807 to a memory or database. In one embodiment, the sub-array of pixels 807 is sent to a sensor 302. For example, the sub-array of pixels 807 may be sent to a sensor 302 as an input for another process. As another example, the actor 306 may generate a voice sample based on the sub-array of pixels 807 that identifies the image and/or elements in the image. As another example, the actor 306 may generate a text description of the image and/or elements in the image based on the sub-array of pixels 807.

At step 1112, the actor 306 determines whether there are anymore aggregated correlithm objects available to process. The actor 306 returns to step 1102 when the actor 306 determines there are more aggregated correlithm objects available. The actor 306 returns to step 1102 for each mask to repeat the process of converting aggregated correlithm objects to sub-arrays of pixels populated with pixel values. Otherwise, the actor 306 terminates method 1100 when there are no more aggregated correlithm objects available to convert for the image.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A device configured to emulate a distance measuring device in a correlithm object processing system, comprising:
a memory configured to store a counting table, wherein the counting table comprises:
a plurality of binary strings; and
a plurality of numeric values, wherein:
each numeric value from the plurality of numeric values is linked with a binary string from the plurality of binary strings; and
the numeric value identifies the number of bits in a corresponding binary string with a logical high value;
a processor operably coupled to the memory, configured to:
receive an input binary string, wherein:
receiving the input binary string comprises receiving the input binary string as a result from performing an XOR operation on a pair of correlithm objects; and
each correlithm object is a point in an n-dimensional space represented by a binary string;
mask a first portion of the input binary string, wherein a second portion of the input binary string is not modified;
identify a first binary string in the counting table matching the second portion of the input binary string;
fetch a first numeric value linked with the first binary string;
increment a count value of a counter by the first numeric value;
mask the second portion of the input binary string;
unmask the first portion of the input binary string;
identify a second binary string in the counting table matching the first portion of the input binary string;
fetch a second numeric value linked with the second binary string;
increment the count value of the counter by the second numeric value; and
output the count value from the counter, wherein the count value corresponds with the distance between the pair of correlithm objects.

2. The device of claim 1, wherein identifying the first binary string in the counting table matching the second portion of the input binary string comprises using a shift register to extract the second portion of the input binary string.

3. The device of claim 1, wherein:
the memory is operable to store a node table that identifies:
a plurality of source correlithm objects, wherein each source correlithm object is a point in a first n-dimensional space represented by a binary string; and
a plurality of target correlithm objects, wherein:
each target correlithm object is a point in a second n-dimensional space represented by a binary string, and
each target correlithm object is linked with a source correlithm object from among the plurality of source correlithm objects; and
performing the XOR operation on the pair of correlithm objects comprises performing the XOR operation on an input correlithm object and a source correlithm object from the plurality of source correlithm objects.

4. The device of claim 1, wherein:
the memory operable to store an actor table that identifies:
a plurality of correlithm objects, wherein each correlithm object is a point in an n-dimensional space represented by a binary string; and
a plurality of real world output values, wherein each real world output value is linked with an correlithm object from among the plurality of correlithm objects; and
performing the XOR operation on the pair of correlithm objects comprises performing the XOR operation on an input correlithm object and a correlithm object from the plurality of correlithm objects in the actor table.

5. A distance measuring method for a correlithm object processing system, comprising:
receiving, by a node engine implemented by a processor, an input binary string, wherein:
receiving the input binary string comprises receiving the input binary string as a result from performing an XOR operation on a pair of correlithm objects; and
each correlithm object is a point in an n-dimensional space represented by a binary string;
masking, by the node engine, a first portion of the input binary string, wherein a second portion of the input binary string is not modified;
identifying, by the node engine, a first binary string in a counting table matching the second portion of the input binary string, wherein the counting table comprises:
a plurality of binary strings; and
a plurality of numeric values, wherein:
each numeric value from the plurality of numeric values is linked with a binary string from the plurality of binary strings; and
the numeric value identifies the number of bits in a corresponding binary string with a logical high value;
fetching, by the node engine, a first numeric value linked with the first binary string;
incrementing, by the node engine, a count value of a counter by the first numeric value;
masking, by the node engine, the second portion of the input binary string;
unmasking, by the node engine, the first portion of the input binary string;
identifying, by the node engine, a second binary string in the counting table matching the first portion of the input binary string;
fetching, by the node engine, a second numeric value linked with the second binary string;
incrementing, by the node engine, the count value of the counter by the second numeric value; and
outputting, by the node engine, the count value from the counter, wherein the count value corresponds with the distance between the pair of correlithm objects.

6. The method of claim 5, wherein identifying the first binary string in the counting table matching the second portion of the input binary string comprises using a shift register to extract the second portion of the input binary string.

7. The method of claim 5, wherein:
performing the XOR operation on the pair of correlithm objects comprises performing the XOR operation on an input correlithm object and a source correlithm object from a plurality of source correlithm objects in a node table; and the node table identifies:
 the plurality of source correlithm objects, wherein each source correlithm object is a point in a first n-dimensional space represented by a binary string; and
 a plurality of target correlithm objects, wherein:
  each target correlithm object is a point in a second n-dimensional space represented by a binary string, and
  each target correlithm object is linked with a source correlithm object from among the plurality of source correlithm objects.

8. The method of claim 5, wherein:
performing the XOR operation on the pair of correlithm objects comprises performing the XOR operation on an input correlithm object and a correlithm object from a plurality of correlithm objects in an actor table;
the input correlithm object is a point in an n-dimensional space represented by a binary string; and
the actor table identifies:
 the plurality of correlithm objects, wherein each correlithm object is a point in the n-dimensional space represented by a binary string; and
 a plurality of real world output values, wherein each real world output value is linked with an correlithm object from among the plurality of correlithm objects.

9. A system configured to measure distance in a correlithm object processing system, comprising:
a counter configured to provide a count value;
a XOR logic gate, configured to:
 receive a pair of correlithm objects as inputs, and
 output the result of performing an XOR operation on the pair of correlithm objects as an input binary string, wherein each correlithm object is a point in an n-dimensional space represented by a binary string;
a device operably coupled to the XOR logic gate and the counter, and comprising:
 a memory configured to store a counting table, wherein the counting table comprises:
  a plurality of binary strings; and
  a plurality of numeric values, wherein:
   each numeric value from the plurality of numeric values is linked with a binary string from the plurality of binary strings; and
   the numeric value identifies the number of bits in a corresponding binary string with a logical high value; and
 a node engine implemented by a processor operably coupled to the memory, configured to:
  receive the input binary string;
  mask a first portion of the input binary string, wherein a second portion of the input binary string is not modified;
  identify a first binary string in the counting table matching the second portion of the input binary string;
  fetch a first numeric value linked with the first binary string;
  increment the count value of the counter by the first numeric value;
  mask the second portion of the input binary string;
  unmask the first portion of the input binary string;
  identify a second binary string in the counting table matching the first portion of the input binary string;
  fetch a second numeric value linked with the second binary string;
  increment the count value of the counter by the second numeric value; and
  output the count value of the counter, wherein the count value indicates the distance between the pair of correlithm objects.

10. The system of claim 9, wherein identifying the first binary string in the counting table matching the second portion of the input binary string comprises using a shift register to extract the second portion of the input binary string.

11. The system of claim 9, wherein the XOR logic gate is integrated with the node engine.

12. The system of claim 9, wherein the counter is integrated with the node engine.

13. The system of claim 9, wherein the XOR logic gate and the counter are integrated with the node engine.

14. The system of claim 9, wherein:
the memory is operable to store a node table that identifies:
 a plurality of source correlithm objects, wherein each source correlithm object is a point in a first n-dimensional space represented by a binary string; and
 a plurality of target correlithm objects, wherein:
  each target correlithm object is a point in a second n-dimensional space represented by a binary string, and
  each target correlithm object is linked with a source correlithm object from among the plurality of source correlithm objects; and
receiving the input binary string comprises receiving the input binary string as a result from performing an XOR operation on an input correlithm object and a source correlithm object from the plurality of source correlithm objects.

15. The system of claim 9, wherein:
the memory operable to store an actor table that identifies:
 a plurality of correlithm objects, wherein each correlithm object is a point in an n-dimensional space represented by a binary string; and
 a plurality of real world output values, wherein each real world output value is linked with an correlithm object from among the plurality of correlithm objects; and
receiving the input binary string comprises receiving the input binary string as a result from performing an XOR operation on an input correlithm object and a correlithm object from the plurality of correlithm objects in the actor table.

* * * * *